US011449985B2

(12) United States Patent
Stanitsas et al.

(10) Patent No.: US 11,449,985 B2
(45) Date of Patent: Sep. 20, 2022

(54) COMPUTER VISION FOR CANCEROUS TISSUE RECOGNITION

(71) Applicants: Regents of the University of Minnesota, Minneapolis, MN (US); Australian National University, Canberra (AU)

(72) Inventors: Panagiotis Stanitsas, Palo Alto, CA (US); Anoop Cherian, Belmont, MA (US); Vassilios Morellas, Plymouth, MN (US); Nikolaos Papanikolopoulos, Minneapolis, MN (US); Alexander Truskinovsky, Williamsville, NY (US)

(73) Assignees: Regents of the University of Minnesota, Minneapolis, MN (US); Australian National University, Canberra ACT (AU)

( * ) Notice: Subject to any disclaimer, the term of this patent is extended or adjusted under 35 U.S.C. 154(b) by 0 days.

(21) Appl. No.: 15/829,562

(22) Filed: Dec. 1, 2017

(65) Prior Publication Data
US 2018/0165809 A1    Jun. 14, 2018

Related U.S. Application Data

(60) Provisional application No. 62/429,353, filed on Dec. 2, 2016.

(51) Int. Cl.
*G06K 9/00* (2022.01)
*G06T 7/00* (2017.01)
(Continued)

(52) U.S. Cl.
CPC ........ *G06T 7/0012* (2013.01); *G06F 3/04842* (2013.01); *G06F 3/04847* (2013.01);
(Continued)

(58) Field of Classification Search
CPC ......... G06T 7/0012; G06T 5/40; G06T 17/10; G06F 3/04842; G06F 3/04847
(Continued)

(56) References Cited

U.S. PATENT DOCUMENTS

| 6,360,021 B1 * | 3/2002 | McCarthy | G06F 17/10 |
| | | | 382/254 |
| 6,381,363 B1 * | 4/2002 | Murching | G06K 9/2081 |
| | | | 382/164 |

(Continued)

FOREIGN PATENT DOCUMENTS

| CN | 105740908 | * | 7/2016 | ........... G06K 9/6256 |

OTHER PUBLICATIONS

Shahi, Maryam, et al., "The Use of Computer Vision for the Diagnosis of Benign and Malignant Smooth Muscle Neoplasms of the Uterus", Poster presented at the 2014 USCAP Annual Meeting, Modern Pathology, 27 (Supplement 2s), (Mar. 2014), 1 pg.

(Continued)

*Primary Examiner* — Stephen P Coleman
(74) *Attorney, Agent, or Firm* — Schwegman Lundberg & Woessner, P.A.

(57) ABSTRACT

A system includes an imager, a processor, and an output module. The imager is configured to provide a plurality of tissue images. The processor is coupled to the imager and is configured to receive the plurality of images. The processor is coupled to a memory. The memory has instructions for determining classification of a region of tissue associated with the plurality of tissue images. Determining classification includes fusing discriminator outputs from a region covariance descriptor and from a normalized color histogram discriminator. The output module is coupled to the processor. The output module is configured to provide a three dimensional representation of the tissue.

11 Claims, 21 Drawing Sheets
(20 of 21 Drawing Sheet(s) Filed in Color)

(51) Int. Cl.
*G06T 5/40* (2006.01)
*G06F 3/04847* (2022.01)
*G06T 17/10* (2006.01)
*G06F 3/04842* (2022.01)

(52) U.S. Cl.
CPC ............... *G06T 5/40* (2013.01); *G06T 17/10* (2013.01); *G06T 2207/10024* (2013.01); *G06T 2207/10056* (2013.01); *G06T 2207/20021* (2013.01); *G06T 2207/20076* (2013.01); *G06T 2207/20081* (2013.01); *G06T 2207/20104* (2013.01); *G06T 2207/30024* (2013.01); *G06T 2207/30028* (2013.01); *G06T 2207/30061* (2013.01); *G06T 2207/30081* (2013.01); *G06T 2207/30096* (2013.01)

(58) Field of Classification Search
USPC ........................................................ 382/133
See application file for complete search history.

(56) References Cited

U.S. PATENT DOCUMENTS

| | | | | |
|---|---|---|---|---|
| 9,092,458 | B1* | 7/2015 | Perona | G06F 16/583 |
| 9,639,777 | B1* | 5/2017 | Moloney | G06K 9/00288 |
| 2003/0194124 | A1* | 10/2003 | Suzuki | G06T 7/0012 |
| | | | | 382/156 |
| 2006/0034508 | A1* | 2/2006 | Zhou | G16H 50/70 |
| | | | | 382/156 |
| 2008/0205773 | A1* | 8/2008 | Ma | G06K 9/00771 |
| | | | | 382/225 |
| 2009/0253978 | A1* | 10/2009 | Hashimshony | A61B 34/25 |
| | | | | 600/407 |
| 2010/0174514 | A1* | 7/2010 | Melkumyan | G06F 17/18 |
| | | | | 703/2 |
| 2010/0250473 | A1* | 9/2010 | Porikli | G06N 20/00 |
| | | | | 706/12 |
| 2011/0068331 | A1* | 3/2011 | Koh | H01L 51/5008 |
| | | | | 257/40 |
| 2011/0135166 | A1* | 6/2011 | Wechsler | G06K 9/00288 |
| | | | | 382/118 |
| 2012/0066253 | A1* | 3/2012 | Osborn | G06Q 30/0201 |
| | | | | 707/769 |
| 2013/0310680 | A1* | 11/2013 | Werahera | A61B 5/0035 |
| | | | | 600/411 |
| 2013/0315465 | A1* | 11/2013 | Cosatto | A61B 5/0033 |
| | | | | 382/133 |
| 2014/0030728 | A1* | 1/2014 | Shioyama | G01N 33/574 |
| | | | | 435/6.14 |
| 2014/0198948 | A1* | 7/2014 | Sigal | G01C 11/04 |
| | | | | 382/103 |
| 2015/0049910 | A1* | 2/2015 | Ptucha | G06F 16/51 |
| | | | | 382/103 |
| 2015/0055857 | A1* | 2/2015 | Wang | G06K 9/18 |
| | | | | 382/165 |
| 2015/0100246 | A1* | 4/2015 | Remzi | G16H 50/30 |
| | | | | 702/19 |
| 2015/0302578 | A1* | 10/2015 | Grady | G16H 30/20 |
| | | | | 382/131 |
| 2016/0042272 | A1* | 2/2016 | Mohaghegh | G06N 3/0472 |
| | | | | 706/19 |
| 2016/0253466 | A1* | 9/2016 | Agaian | G06K 9/629 |
| | | | | 382/128 |
| 2016/0292847 | A1* | 10/2016 | Liu | G06T 19/20 |
| 2017/0041529 | A1* | 2/2017 | Park | H04N 5/23293 |
| 2017/0053398 | A1* | 2/2017 | Mahoor | G06K 9/6269 |

OTHER PUBLICATIONS

Stanitsas, Panagiotis, et al., "Active Convolutional Neurl Networks for Cancerous Tissue Recognition", 2017 IEEE International Conference on Image Processing (ICIP), (2017), 1367-1371.

Stanitsas, Panagiotis, et al., "Evaluation on Feature Descriptors for Cancerous Tissue Recognition", 2016 23rd International Conference on Pattern Recognition (ICPR), Cancun Center, Cancun, Mexico, Dec. 4-8, 2016, (2016), 1490-1495.

* cited by examiner

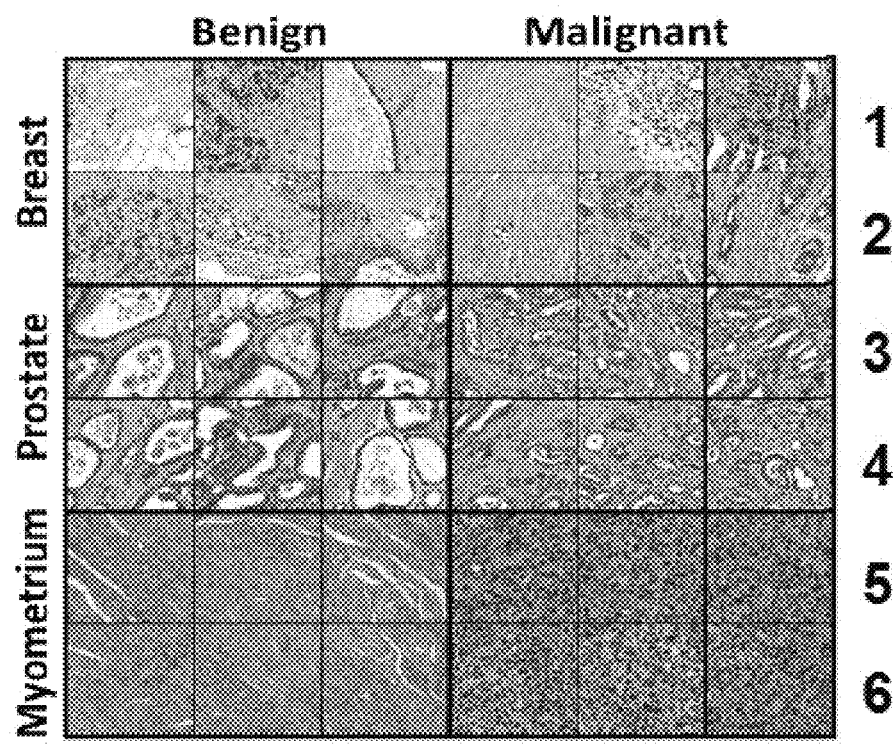
FIG. 11
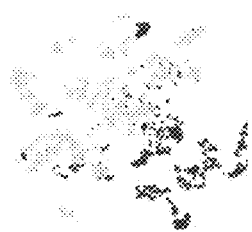 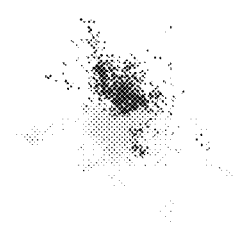 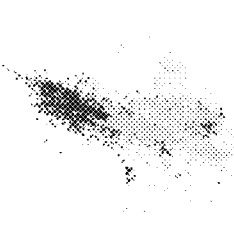 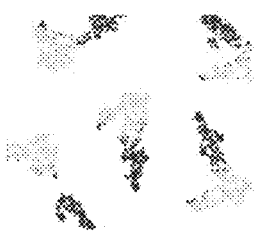
FIG. 12A   FIG. 12B   FIG. 12C   FIG. 12D

COMPUTER VISION FOR CANCEROUS TISSUE RECOGNITION

CROSS-REFERENCE TO RELATED APPLICATION

This application claims priority to U.S. Provisional Application No. 62/429,353, filed on Dec. 2, 2016, which is hereby incorporated in its entirety.

STATEMENT REGARDING FEDERALLY SPONSORED RESEARCH OR DEVELOPMENT

This invention was made with government support under IIP-1230817, IIP-0934327, CNS-1039741. SMA-1028076, CNS-1338042, IIP-1439728, OISE-1551059, and CNS-1514626 awarded by National Science Foundation. The government has certain rights in the invention.

BACKGROUND

Successful treatment of cancer requires early and accurate pathologic diagnosis. However, hospital and clinics today are facing dwindling compensation from health care payers, leading to ever-increasing diagnostic caseloads spread among fewer and fewer surgical pathologists. During a pathologist's workday, substantial time is spent scrutinizing tissue slides under a microscope for the evidence of disease, which significantly limits the number of patient cases that even a skilled pathologist is able to diagnose every day, while maintaining a high level of accuracy and informativeness of the diagnosis.

SUMMARY

A specialized computer system implementing machine learning can be tailored toward diagnostic classification of cancer and facilitate semi-automation of the disease identification and classification procedure. In one example, the present subject matter includes a computer system configured to specifically identify the type of cancer affecting a region in a tissue sample. In some examples, the present subject matter utilizes prior information, such as the organ or tissue sampled and relevant symptoms, to identify a specific type of cancer or disease affecting an organ. Therefore, disease identification can also form a part of the diagnostic process.

Each of these non-limiting examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

The document includes at least one drawing executed in color. Copies of this patent or patent application publication with color drawing(s) will be provided by the Office upon request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

The various figures are as follows:

FIG. 1 illustrates a graphical user interface (GUI) for annotation of an image, according to one example.

Figure 2A:
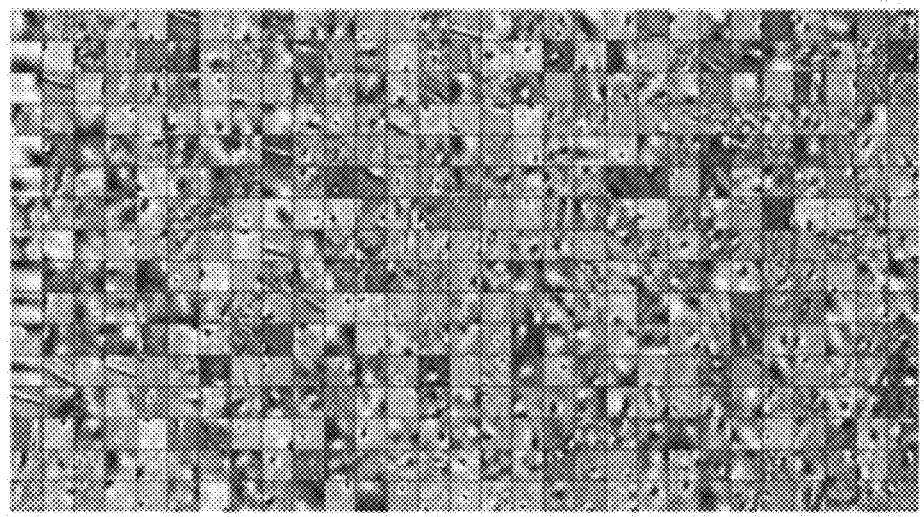
Figure 2B:
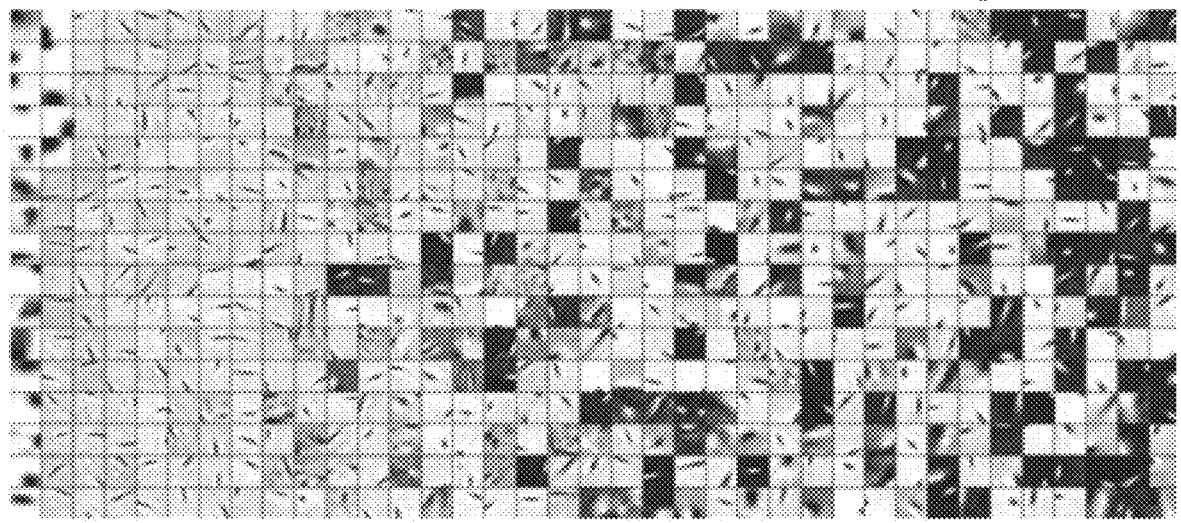

FIGS. 2A and 2B each illustrate an example of basis atoms of a dictionary, according to one example.

Figure 3:
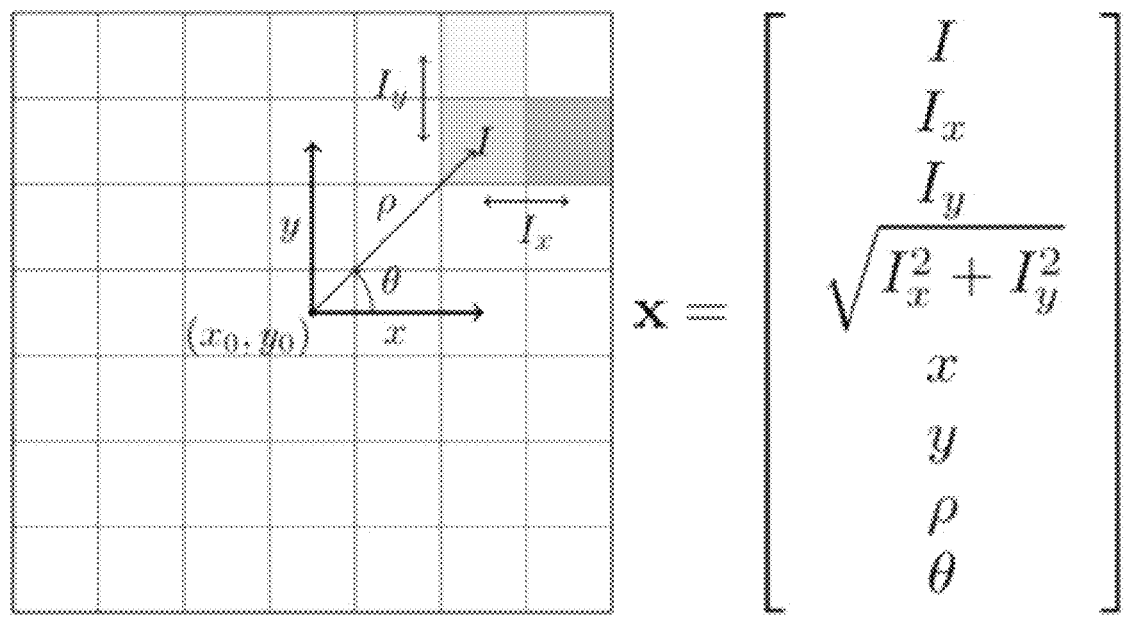

FIG. 3 illustrates an example of the region covariance descriptor, according to one example.

Figure 4:
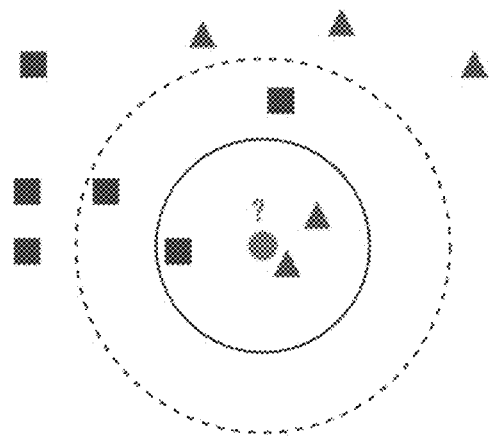

FIG. 4 illustrates an example of k-NN classification, according to one example.

Figure 5A:
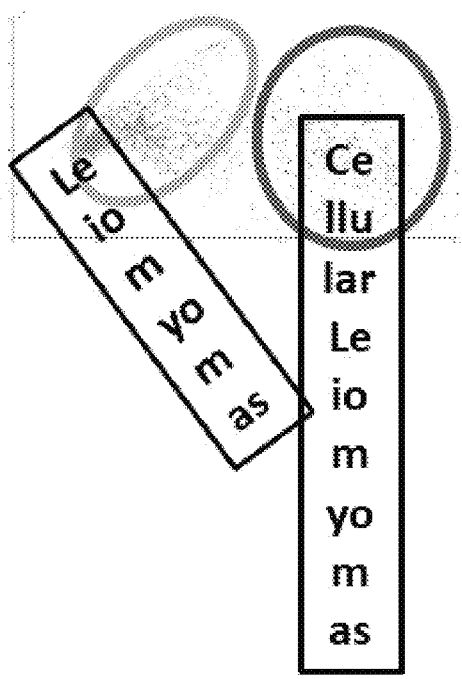
Figure 5B:
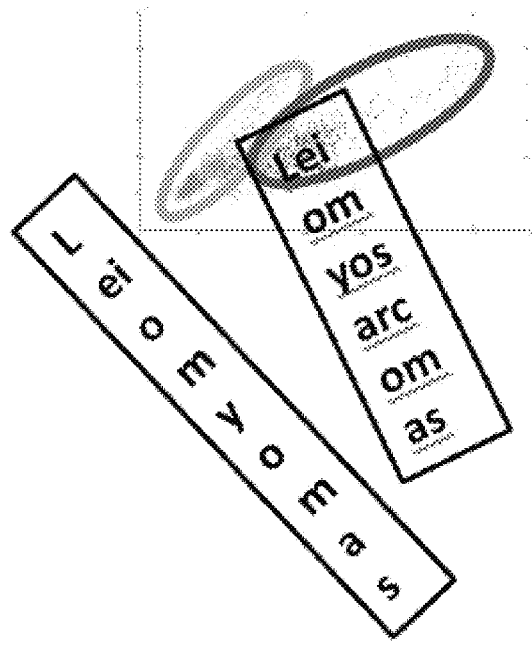
Figure 5C:
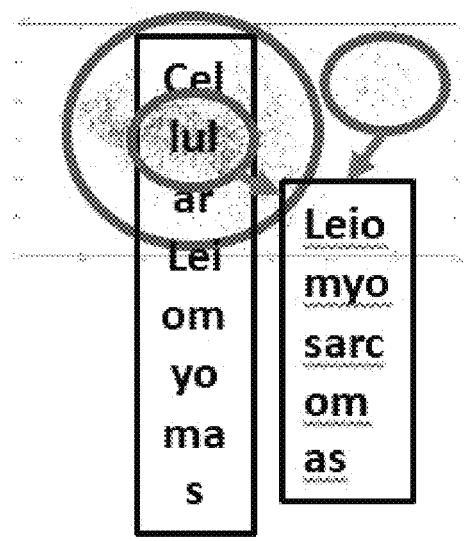

FIGS. 5A, 5B and 5C illustrate spatial distribution of different classes using ISOMAP, according to one example.

Figure 6A:
Figure 6B:
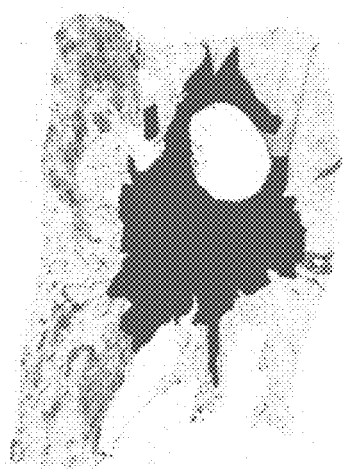
Figure 6C:
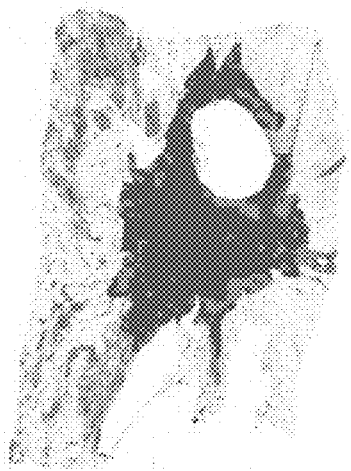

FIGS. 6A, 6B, and 6C illustrate an example of using tensor dictionary learning to detect carcinoma of the breast, according to one example.

Figure 7A:
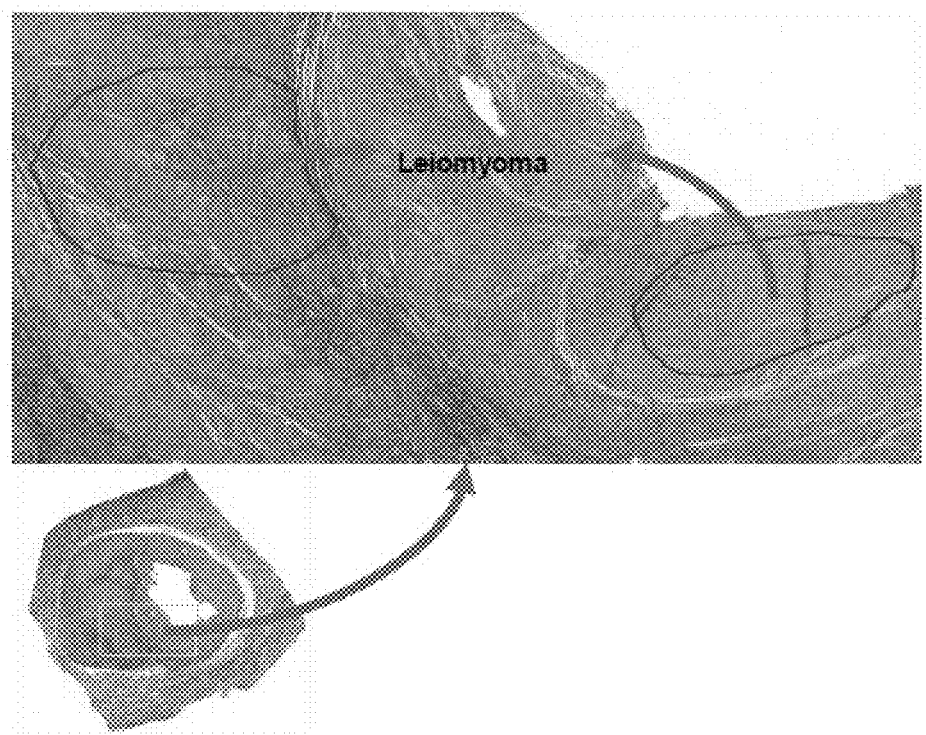
Figure 7B:
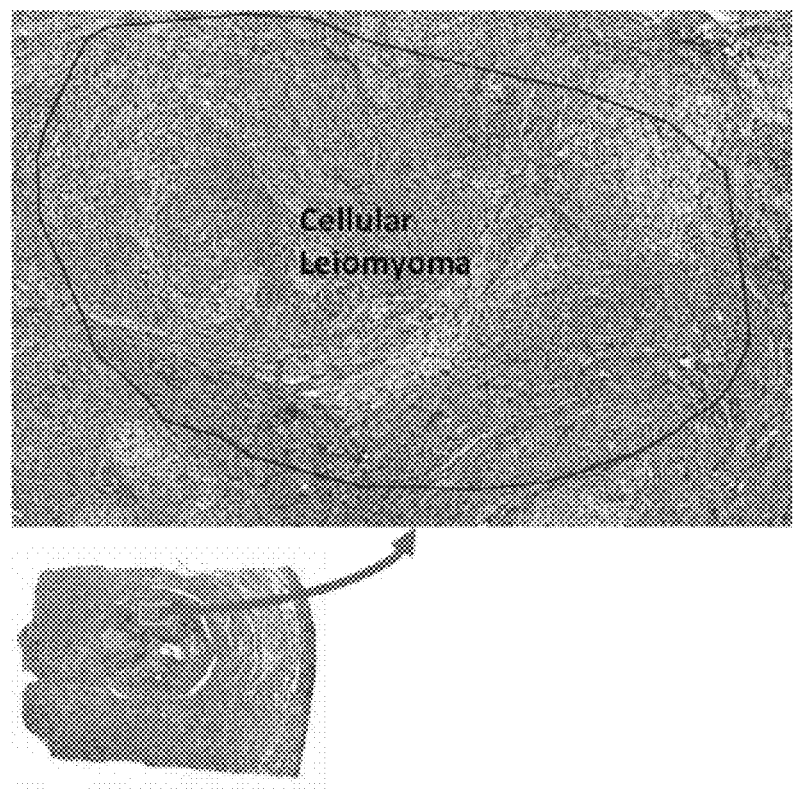
Figure 7C:
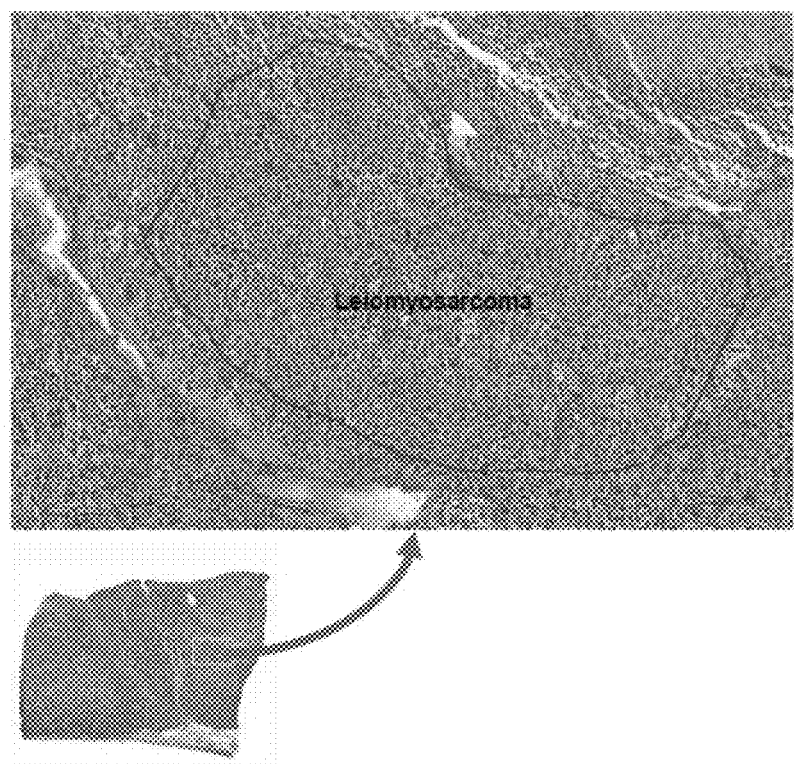

FIGS. 7A-7C illustrate tissue images and user-selected regions for consideration, according to one example.

Figure 8A:
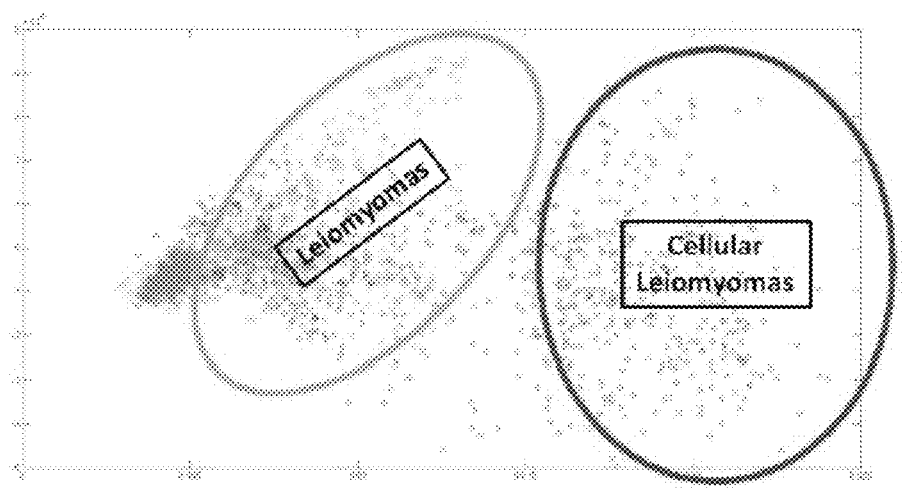
Figure 8B:
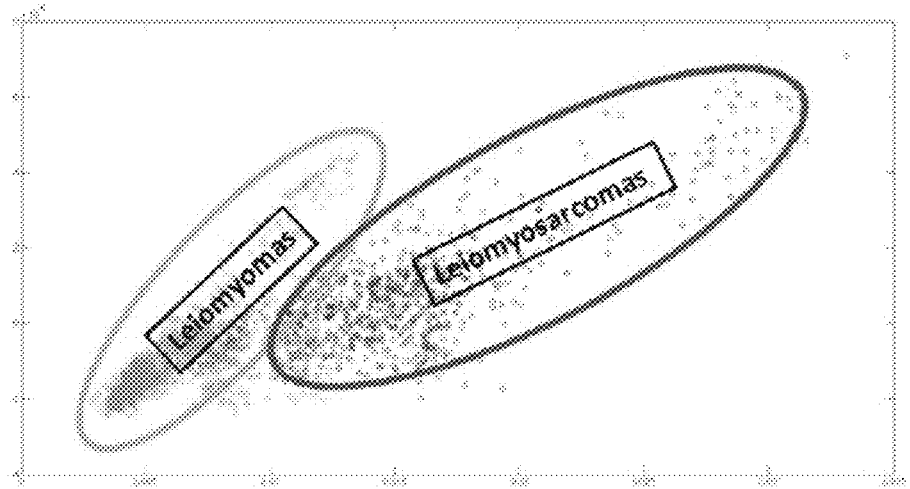
Figure 8C:
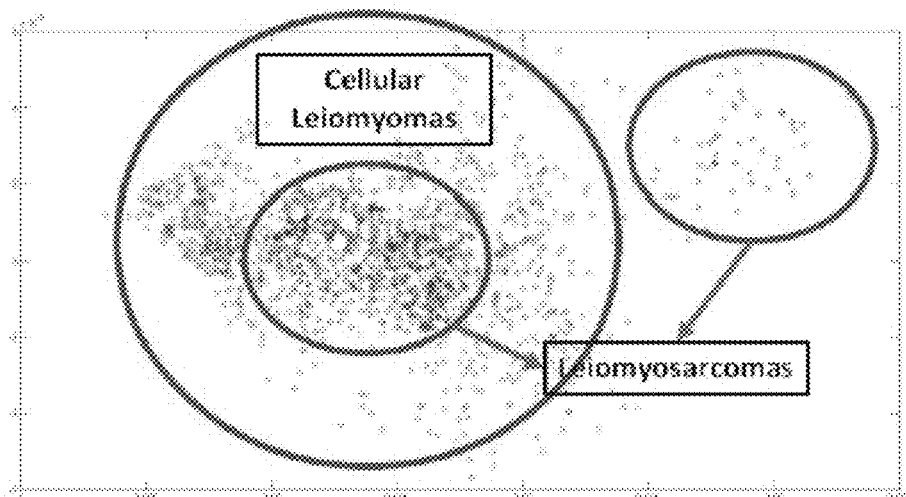

FIGS. 8A, 8B, and 8C illustrate two-dimensional graphs showing application of an RCD process, according to one example.

Figure 9:
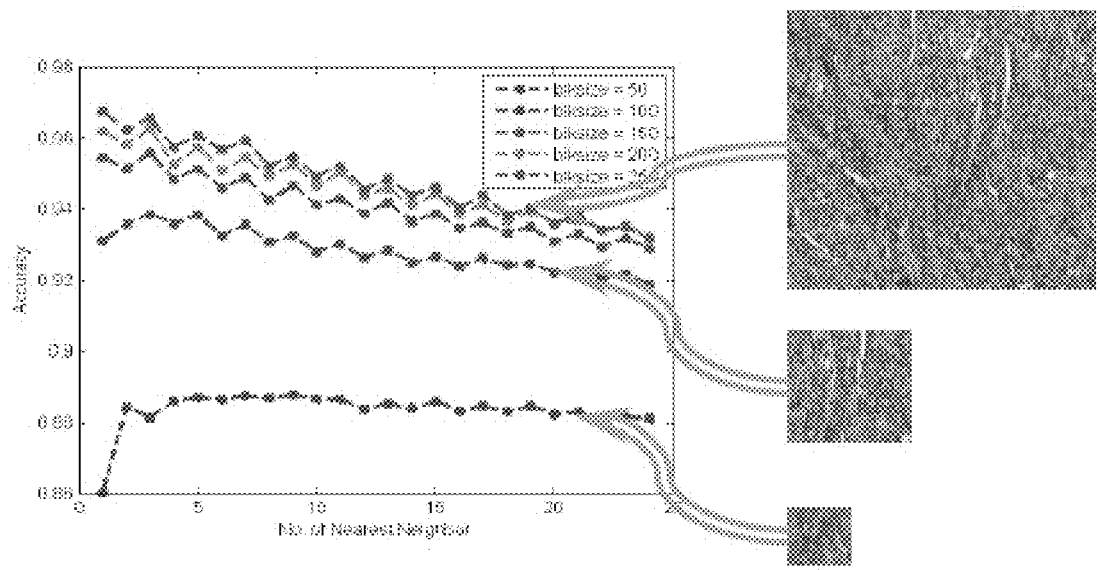

FIG. 9 illustrates a graph depicting accuracy and number of nearest neighbor, according to one example.

Figure 10:
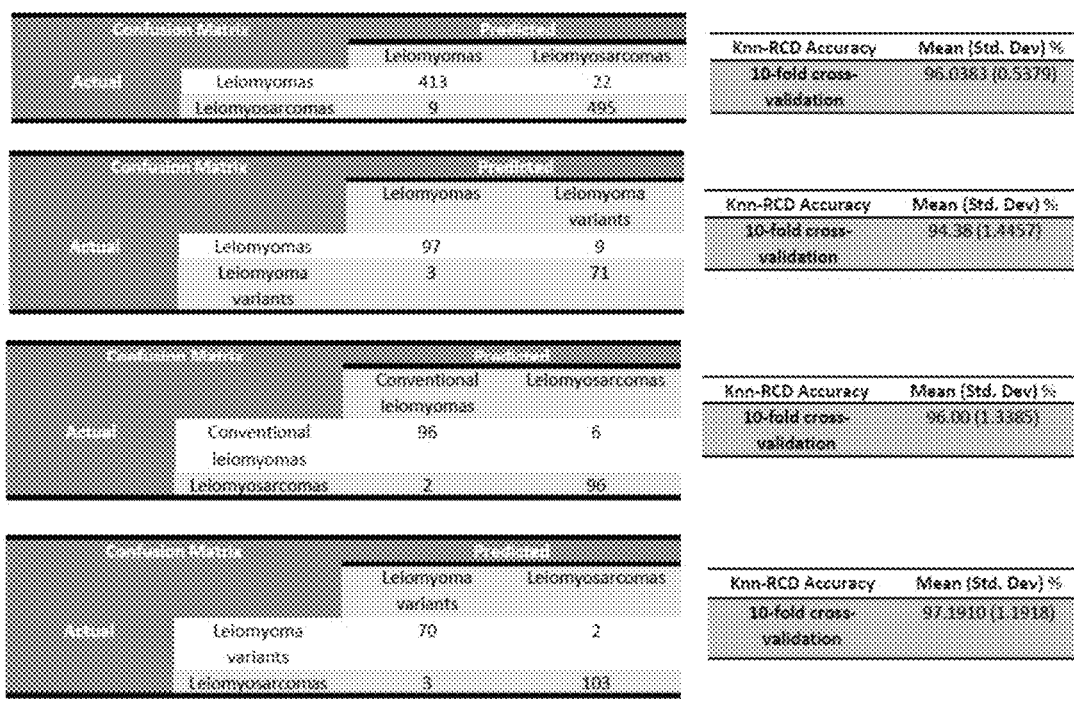

FIG. 10 illustrates tabulated results, according to one example.

FIG. 11 illustrates stained samples for three types of tissue, according to one example.

FIGS. 12A, 12B, 12C, and 12D illustrate a low dimensional embedding using tSNE for the myometrium dataset, according to one example.

Figure 13A:
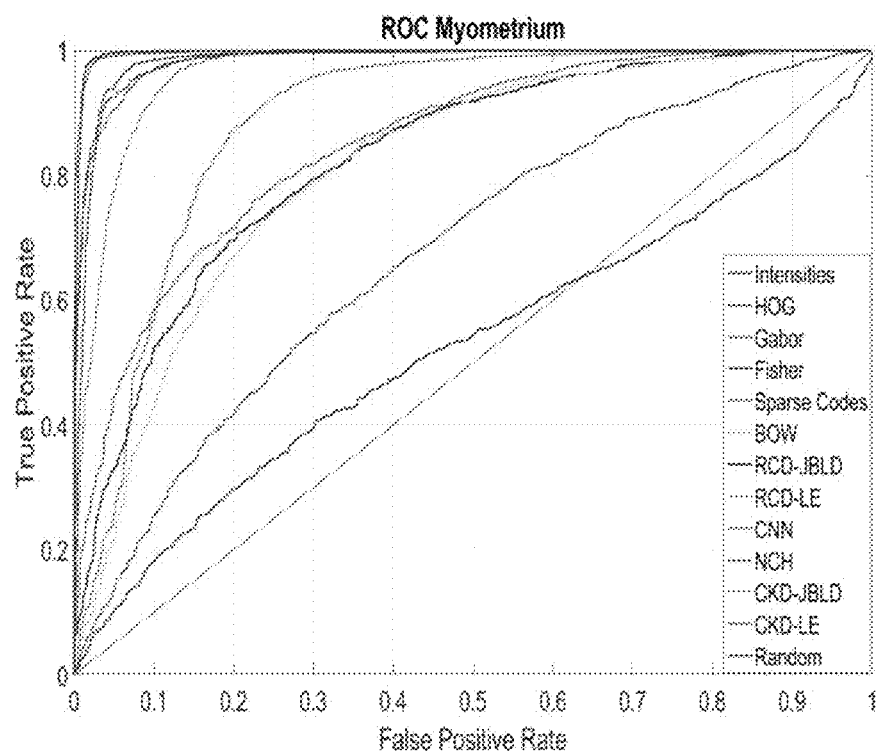
Figure 13B:
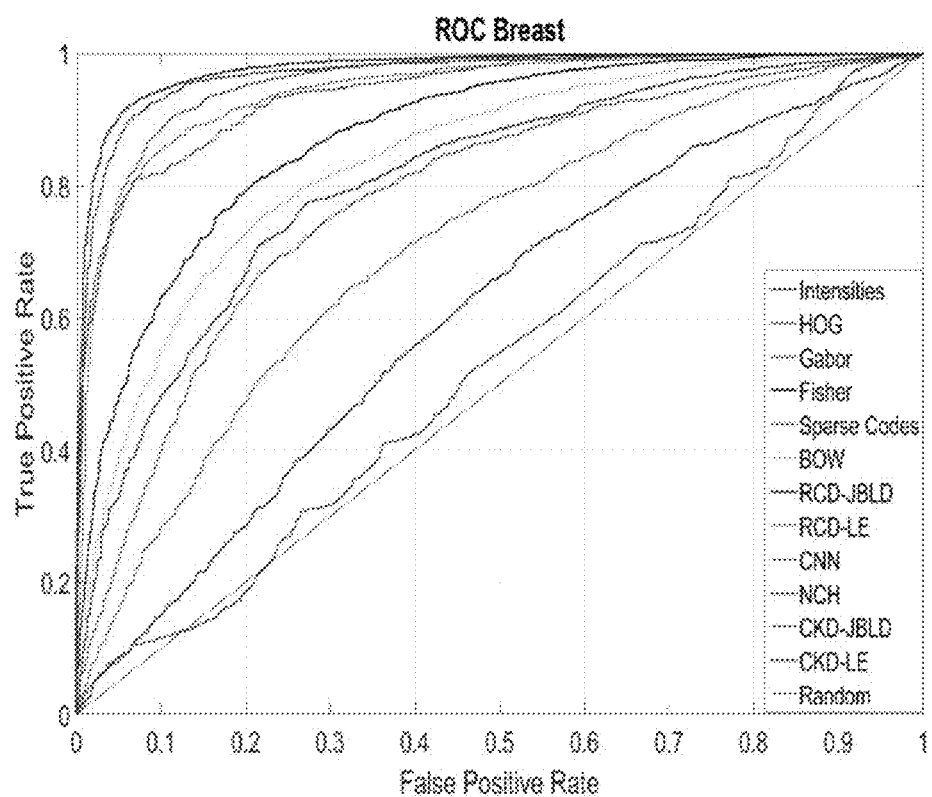
Figure 13C:
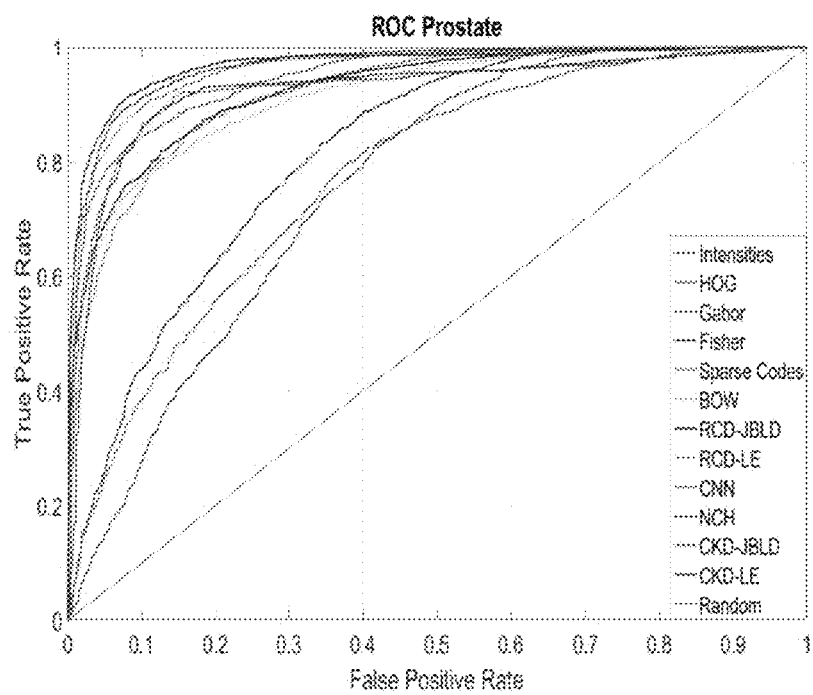

FIGS. 13A, 13B, and 13C illustrate ROC curves for myometrium, breast and prostate, respectively, according to one example.

Figure 14:
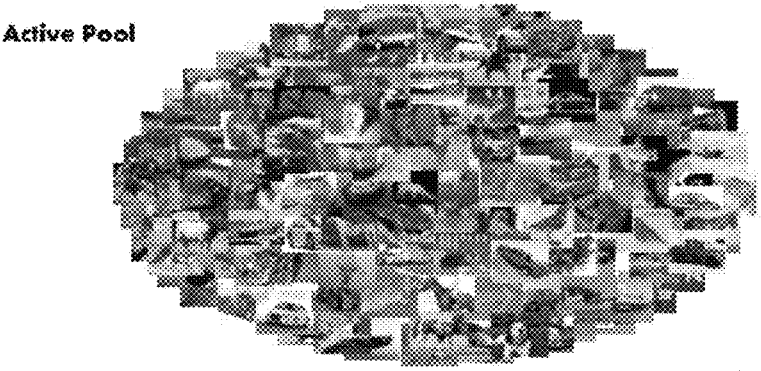
Figure 14:
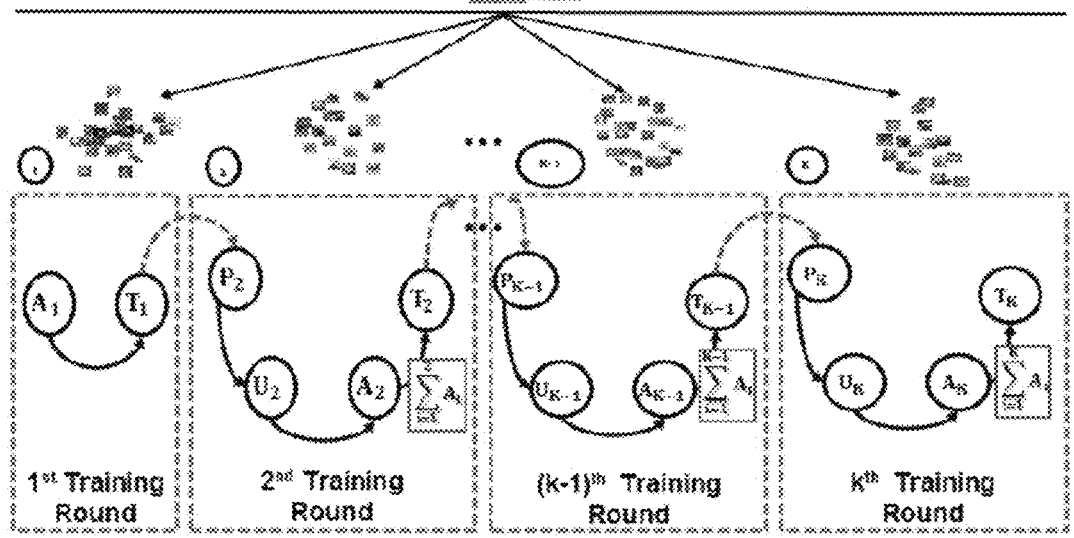

FIG. 14 illustrates an outline of an active training scheme, according to one example.

Figure 15:
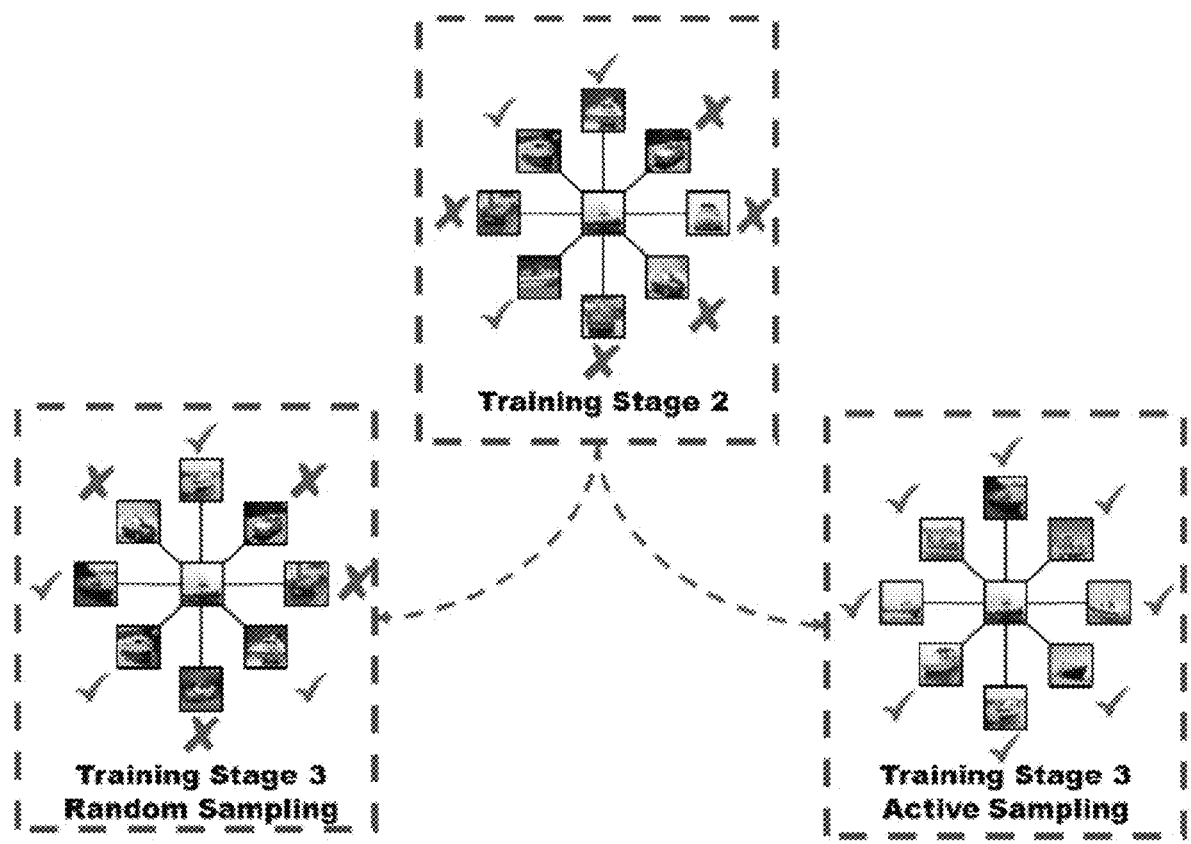

FIG. 15 illustrates an example of Nearest Neighbor (NN) search, according to one example.

Figure 16:

FIG. 16 illustrates selected samples of the CIFAR-10 dataset, according to one example.

Figure 17:
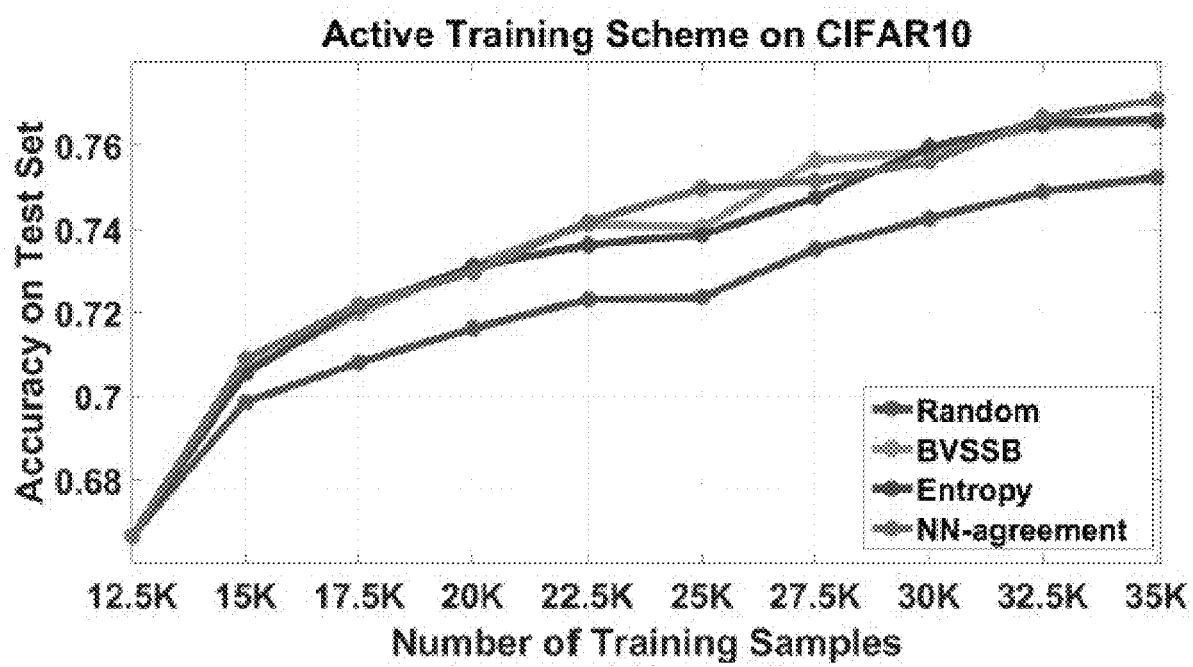

FIG. 17 illustrates results on the CIFAR-10 dataset, according to one example.

Figure 18:
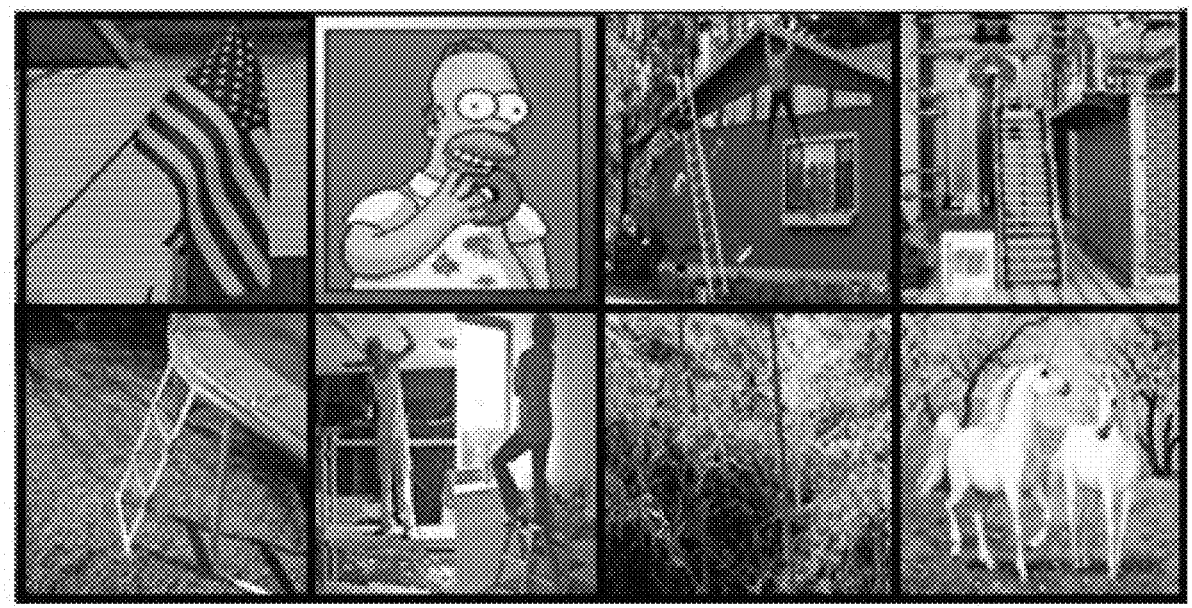

FIG. 18 illustrates samples of the Caltech-256 dataset, according to one example.

Figure 19:
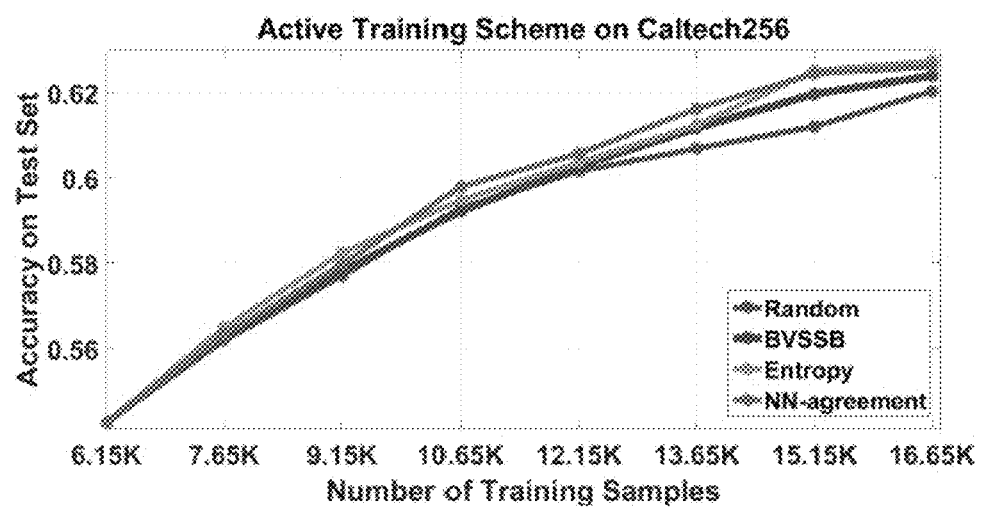

FIG. 19 illustrates results on the Caltech-256 dataset, according to one example.

Figure 20:
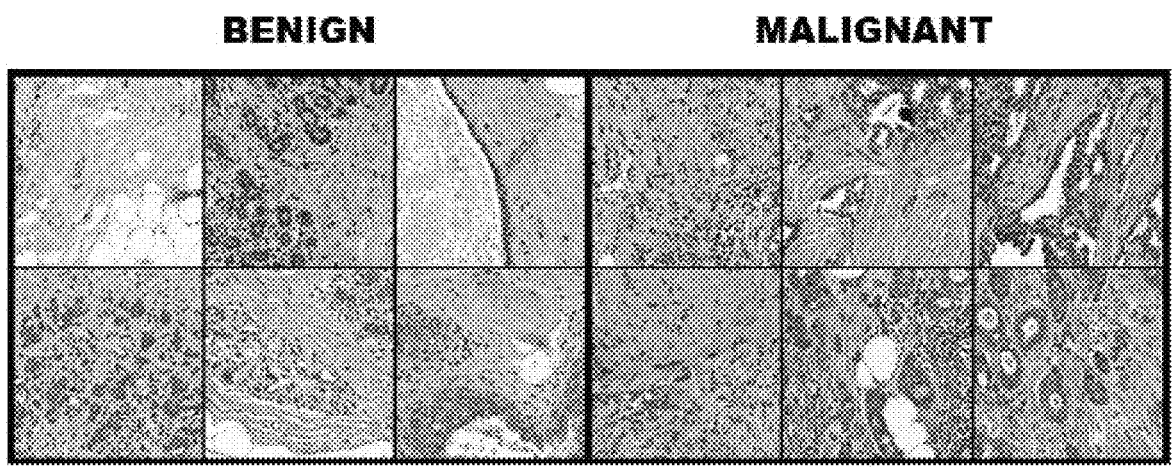

FIG. 20 illustrates breast tissue H&E stained samples, according to one example.

Figure 21:
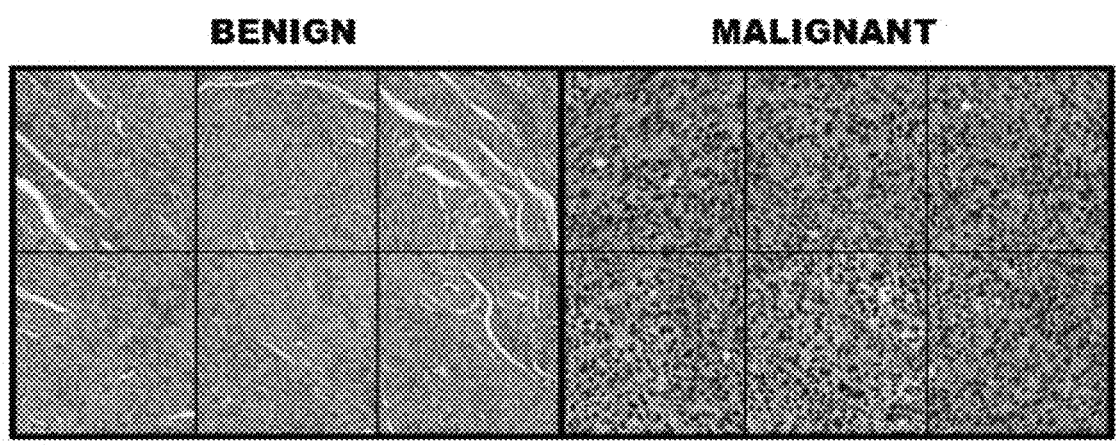

FIG. 21 illustrates myometrium tissue H&E stained samples, according to one example.

Figure 22:
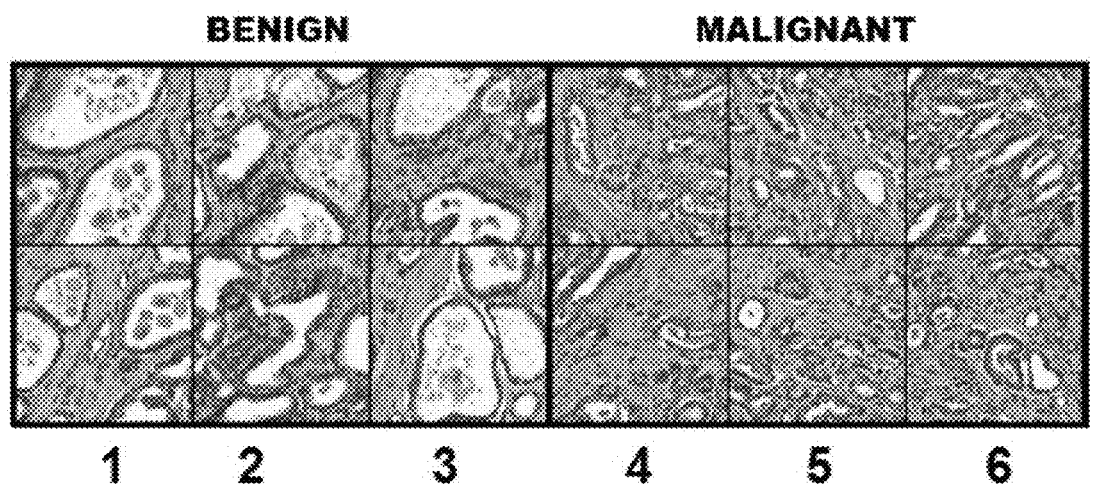

FIG. 22 illustrates prostate tissue H&E stained samples, according to one example.

Figure 23:
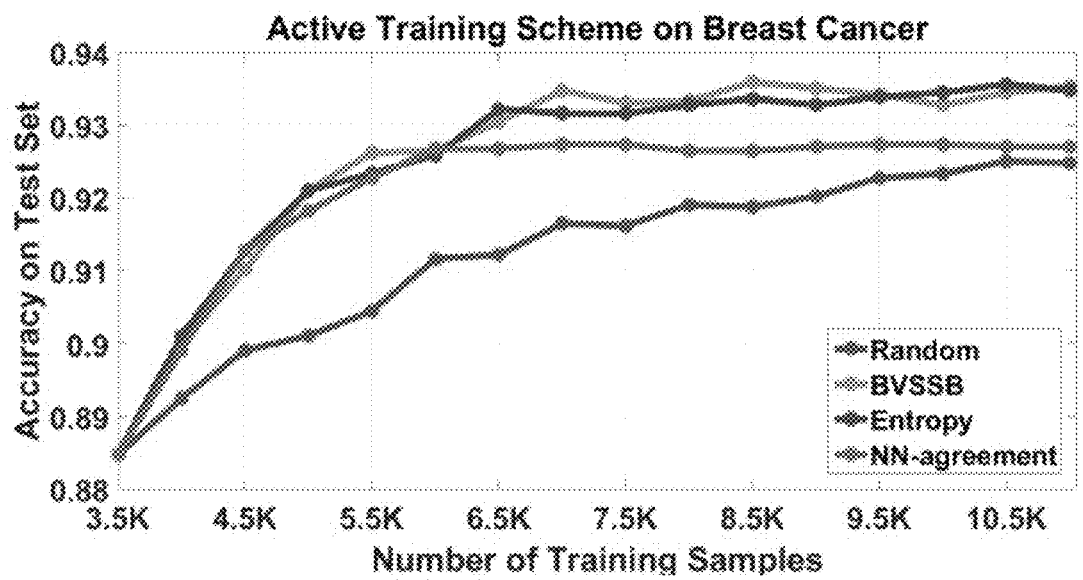

FIG. 23 presents the results obtained on the breast cancer dataset, according to one example.

Figure 24:
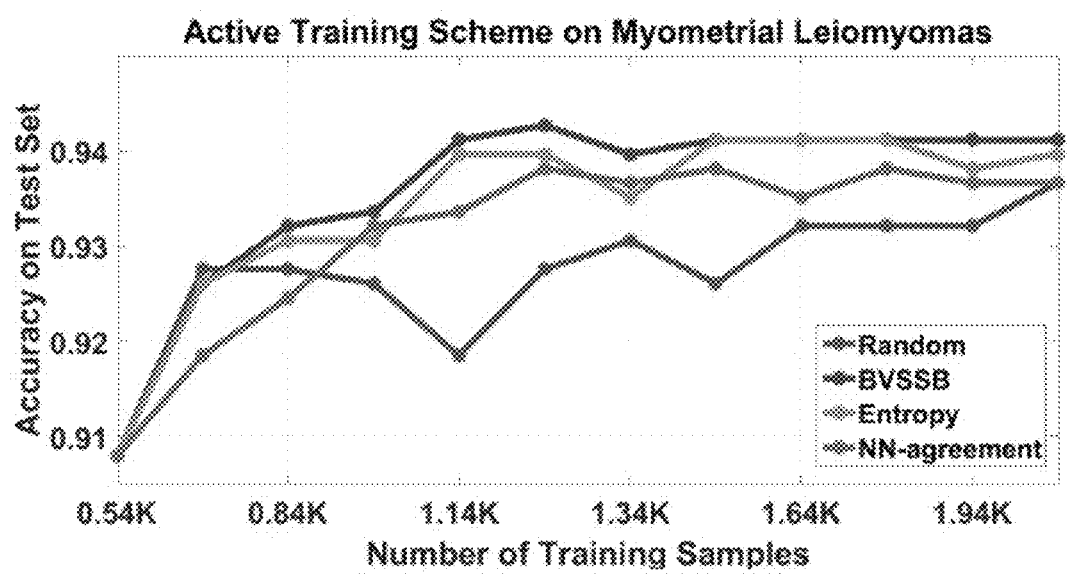

FIG. 24 illustrates results on the Myometrial Leiomyomas dataset, according to one example.

Figure 25:
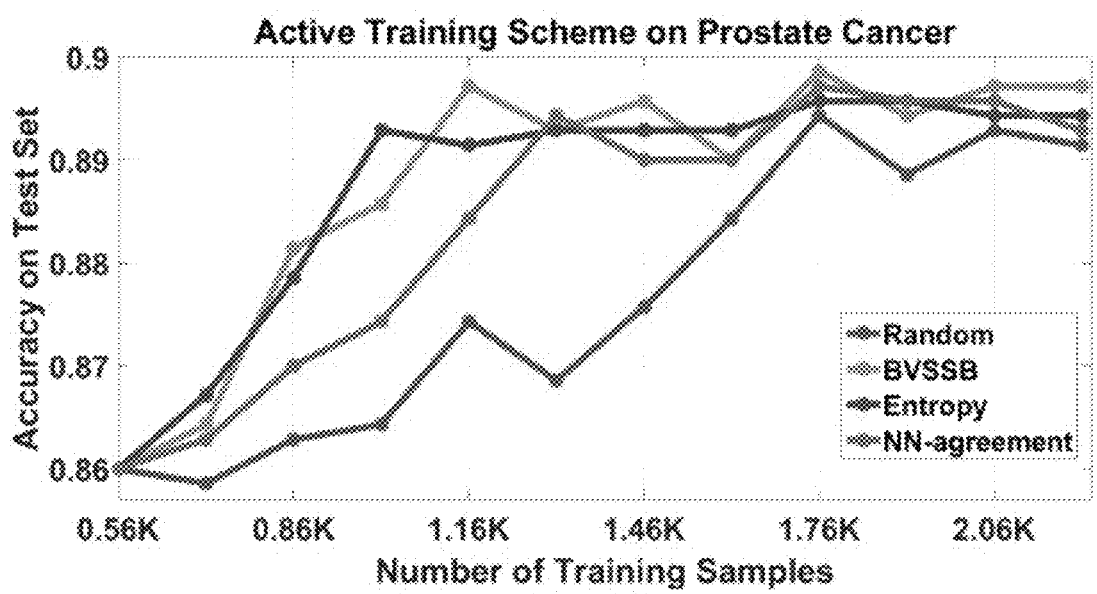
Figure 26A:
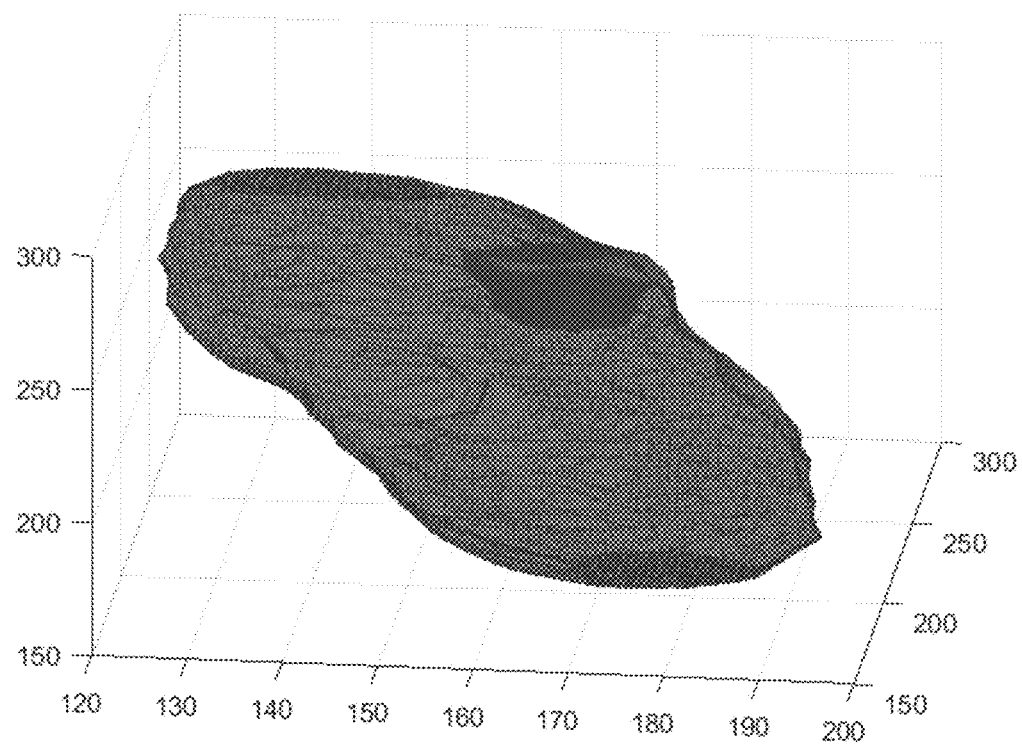
Figure 26B:
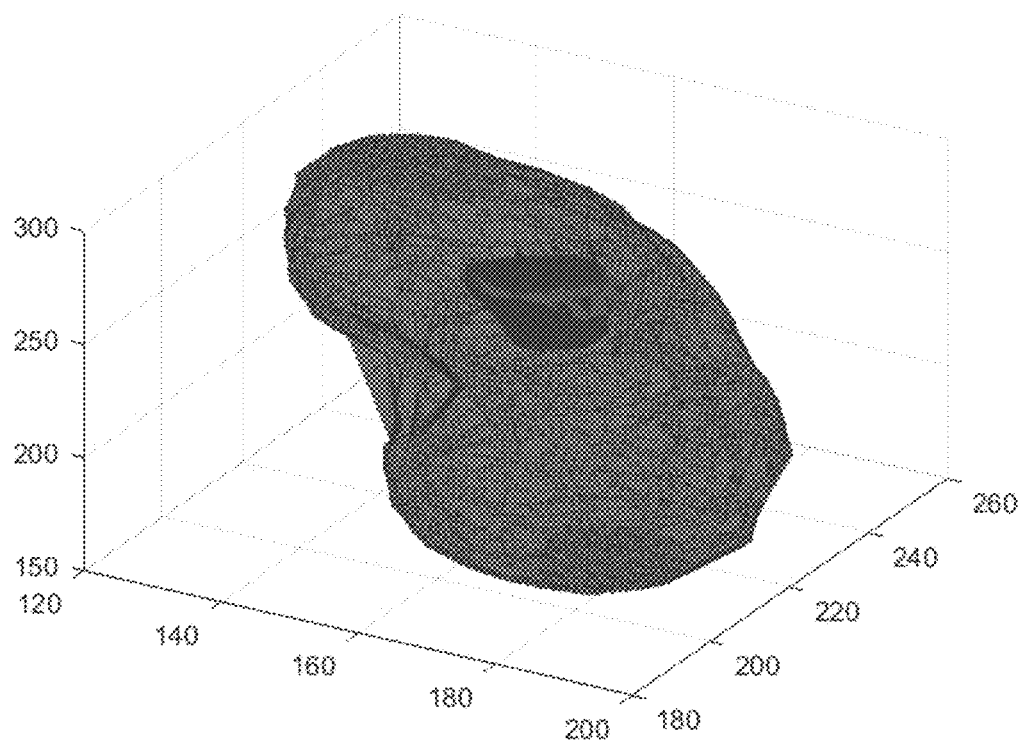
Figure 26C:
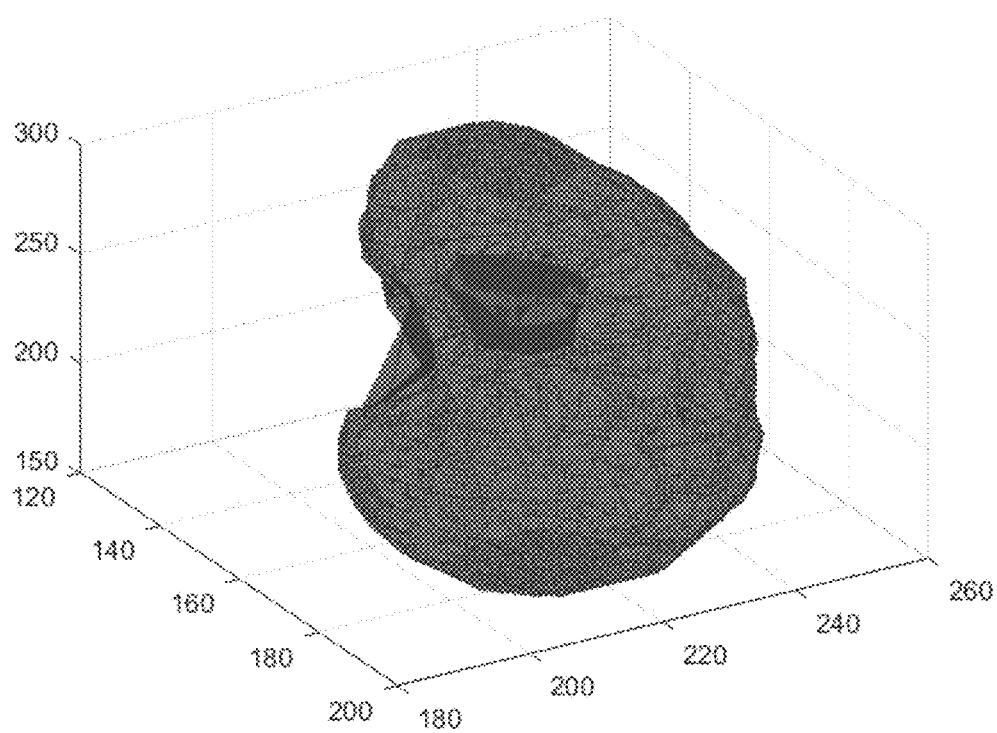
Figure 26D:
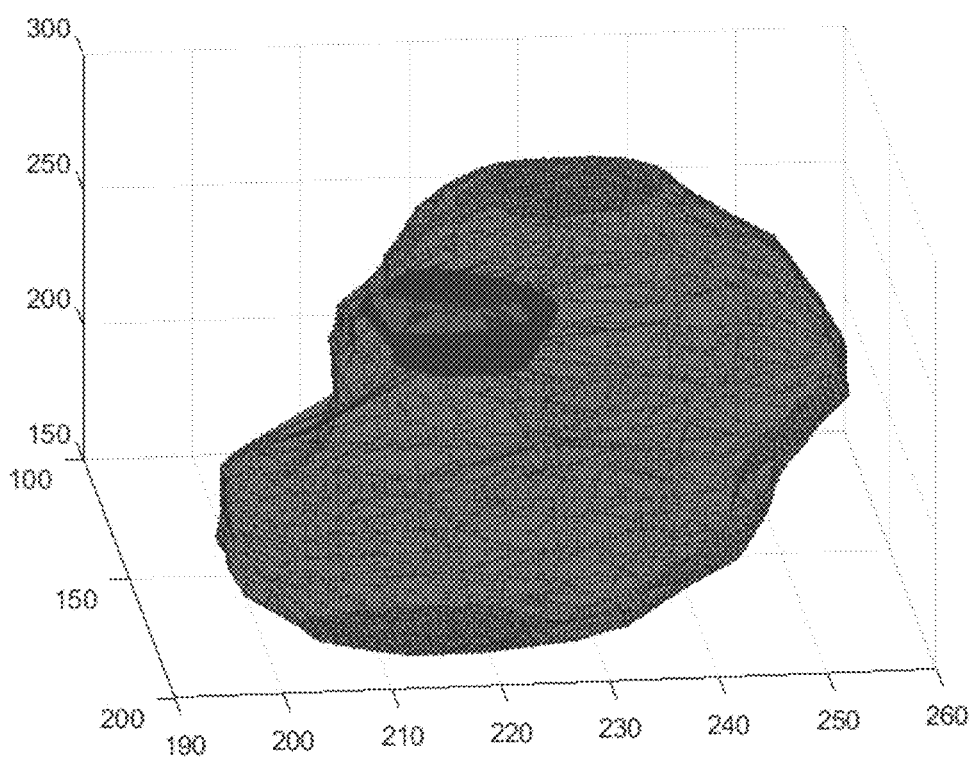
Figure 26E:
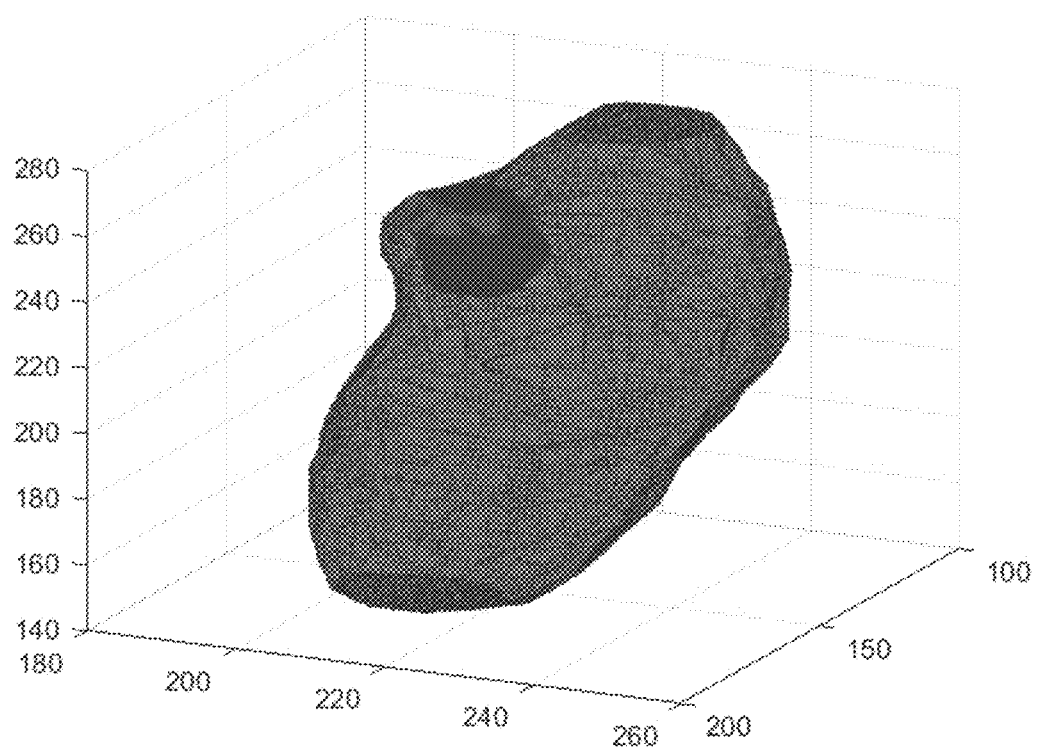
Figure 26F:
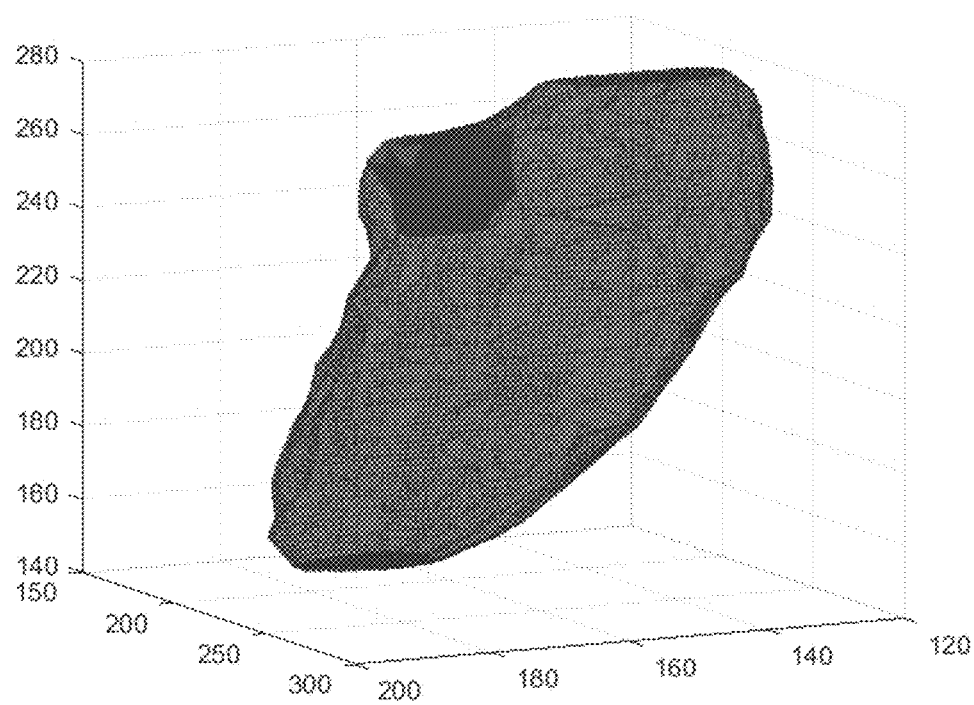
Figure 26G:
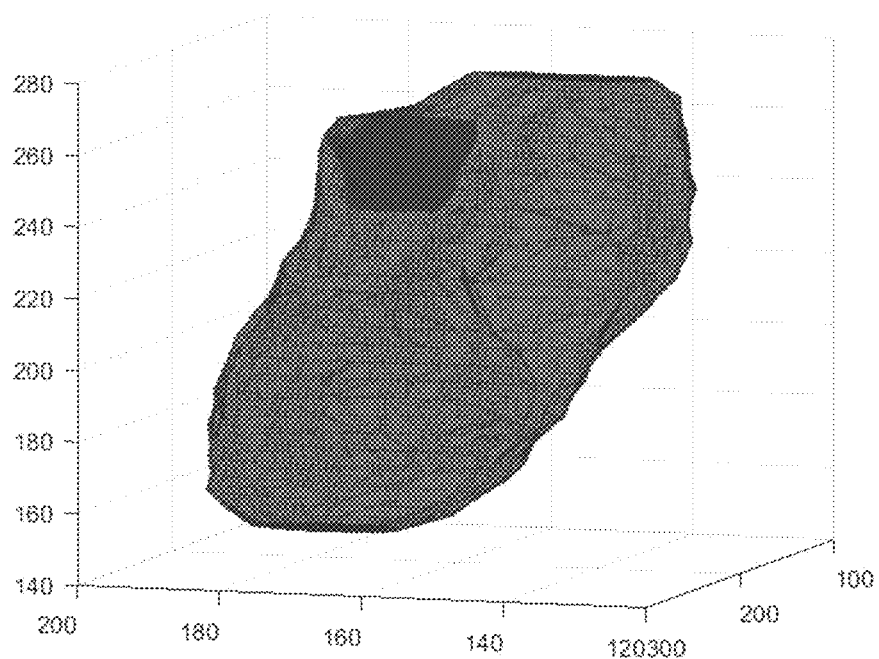

FIG. 25 illustrates the results on the Prostate Cancer dataset, according to one example.

FIGS. 26A-26G illustrates views of a kidney, according to one example.

Figure 27:
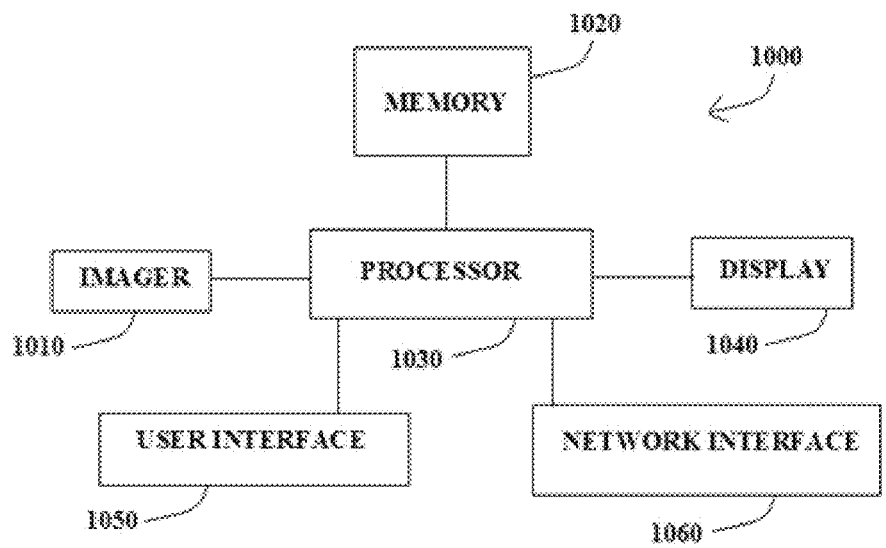

FIG. 27 illustrates a system, according to one example.

Figure 28:
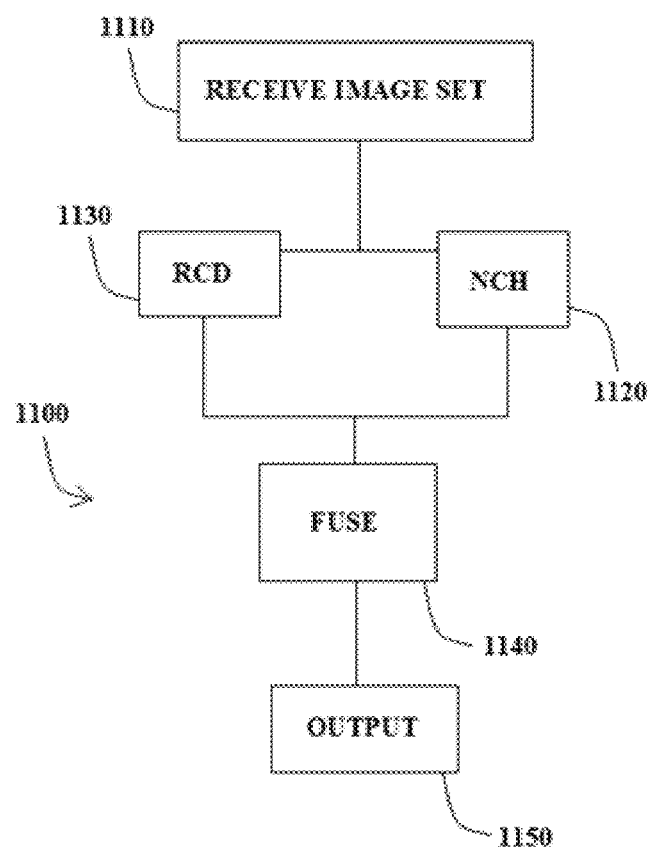

FIG. 28 illustrates a method, according to one example.

DETAILED DESCRIPTION

Part 1 describes computer vision methods in surgical pathology, including detection and diagnosis.

Part 2 describes the use of computer vision for the diagnosis of benign and malignant smooth muscle neoplasms of the uterus and other tissue.

Part 3 provides additional details for the use of computer vision for the diagnosis of benign and malignant smooth muscle neoplasms of the uterus and other tissue.

Part 4 describes evaluation of feature descriptors for cancerous tissue recognition.

Part 5 describes active convolutional neural networks for cancerous tissue recognition.

Part 6 includes additional notes.

Part 1: Computer Vision Methods in Surgical Pathology Including Detection and Diagnosis An example of the present subject matter can expedite the process of pathological diagnosis through computer-assisted diagnosis. One example entails an image processing and machine learning tailored toward cancer diagnosis. Various example of the present subject matter can be tailored to evaluate different cancers or different tissue conditions.

Traditional cancer diagnosis using biopsy or surgical resection involves visual inspection of the tissue slide for regions of interest, and further analysis of these regions to identify the specific type and progression stage of cancer.

Computer-assisted pre-processing, on the other hand, can show the pathologist the regions suspected to be cancerous and exclude those regions identified as benign or healthy tissue. This can reduce the time burden on the pathologist and improve efficiency. By tuning a computer vision system to have negligible false positives and zero false negatives, the expert surgical pathologist's attention can focus on the suspicious regions, thus allowing the pathologist to search efficiently over a patient's tissue samples in a shorter period of time. In one example, the possibility of false negatives is under 4% and the rate of false positives is approximately 10%.

Machine learning can be tailored toward diagnostic classification of cancer and facilitate semi-automation of the disease identification and classification procedure. In one example, the present subject matter includes a computer system configured to specifically identify the type of cancer affecting a region in a tissue sample. In some examples, the present subject matter utilizes prior information, such as the organ or tissue sampled and relevant symptoms, to identify a specific type of cancer or disease affecting an organ. Disease identification can also form a part of the diagnostic process.

An example of the present subject matter can uncover new insights into the types of normal and diseased architecture in different tissues, visual or abstract, which might be used to support efficient and early diagnosis of different types of cancer.

Traditionally, when analyzing the possibility of cancer in a region of tissue, a human expert uses rule-based methods acquired through training and professional experience. In contrast, a computer-based example can efficiently utilize using abstract representation with user-supplied labeled training data. In one example, labeled images from various classes are provided, it is sufficient for machine learning to learn models to classify the corresponding tissue regions, and reveal and extract semantic information regarding the structure of the problem. Some structural information thus uncovered is consistent with pathologists' knowledge, and can be used as evidence to support current rules used in the diagnostic process, while other machine findings may potentially lead to new diagnostic paradigms in surgical pathology.

An example of the present subject matter utilizes high-resolution images of tissue slides and includes image processing and machine learning to diagnose pathology and detect and segment cancerous regions from healthy or benign regions.

Data Acquisition

Data acquisition can include acquisition of high-resolution digital scans of tissue biopsy images. Sufficient examples from both healthy and cancerous classes can be selected by a pathologist for the purpose of training a machine learning system. For example, different tissues and organs, including tumors of the endometrium, the prostate, the breast, the myometrium, and the ovary, can be utilized. The data can be augmented with more data from these types of cancers, and samples from cancers affecting other parts of the body, including the colon, pancreas, lung, and others. One example of the present subject matter includes a graphical user interface (GUI) to expedite the data acquisition process.

Figure 1:
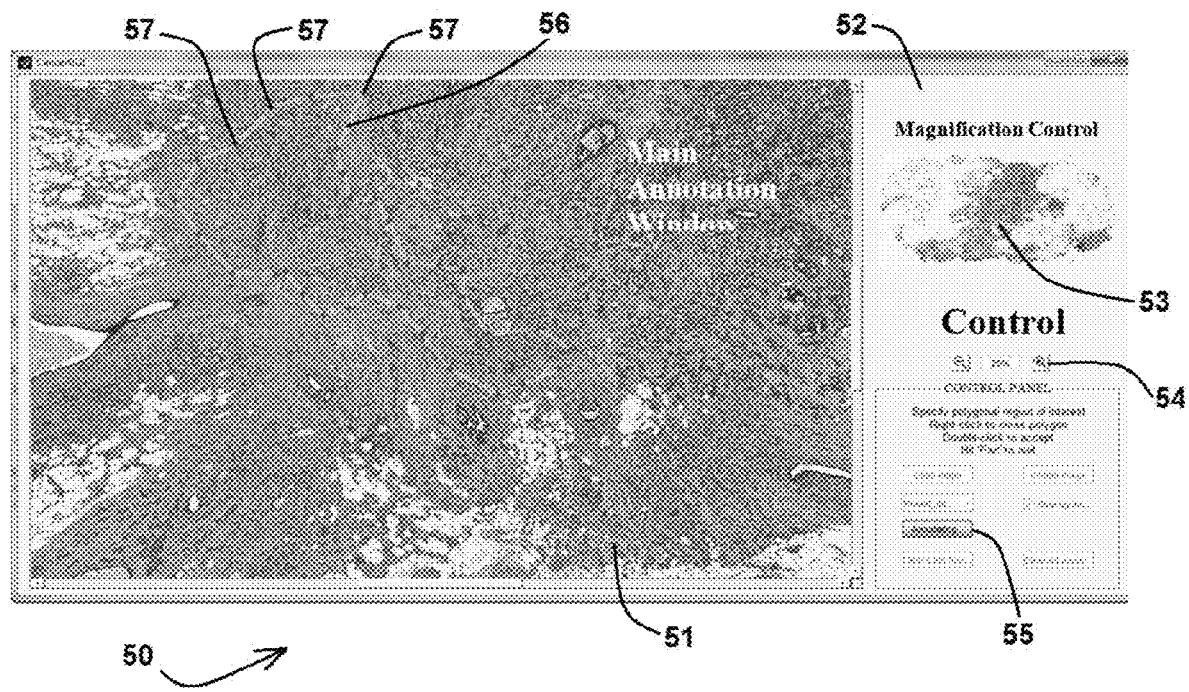

FIG. 1 illustrates an example of GUI 50 suitable for annotation of an image. GUI 50 can be used to train a computer in accordance with various examples presented elsewhere in this document, and in the example shown, includes first panel 51 and second panel 52.

A GUI can include a plurality of user operable controls displayed on a screen. In the example shown. GUI 50 allows a user to annotate cancerous regions in high-resolution tissue images. For example, first panel 51 of a display window can be configured to depict a tissue image and a second panel 52 of the display window can be configured with a control panel. First panel 51, can serve as a main annotation window and provide a working area where an expert can perform annotation using a mouse or other cursor control device. A user can select multiple irregular polygons, such as polygon 56, which enclose the areas containing either healthy tissues or cancerous tissues. In the example illustrated, polygon 56 is defined by user selection of a number of vertices, some of which are depicted here as vertex 57. Other examples for user selection of a region are also contemplated, including a painting function or a drawing function.

In the example shown, second panel 52 provides a control panel including magnification control 54. In the example, image 53 depicts the entire biopsy image and second panel 52 includes a magnification box. The area inside the box is displayed in the main annotation window on the left, and becomes the main working area. In the example shown, magnification (or zooming in and out) is selected by changing the display percentage using + or − buttons. By moving the magnification box around the entire image, the expert can easily select the regions of interest. The bottom part of the control panel handles some basic operations, including loading and unloading an image and starts to perform annotation. A control panel can also provide a pop-up menu having names of different tissues and their conditions (such as healthy or cancerous), and can be used to label the regions created by the user in the GUI. In one example, the GUI can be manipulated to create an annotated representation including the vertices of the polygons and their corresponding labels. This information can be used in training a machine learning system. The GUI provides a tool to allow an expert to annotate images used to train a computer according to one example.

Examples of the present subject matter can be utilized to analyze tissue samples from carcinomas of the endometrim and the prostate, the breast, ovary, smooth muscle neoplasms of the myometrium, including leiomyomas, leiomyosarcomas and leiomyoma variants. According to one example, analysis can include four images each of two diagnostic classes: profilerative endometrium and well-differentiated endometrioid carcinoma of the endometrium; 5 images each of 2 diagnostic classes: carcinoma and benign breast; 31 images of carcinomas of the prostate, 8 images from benign of the prostate, and 30 from a preinvasive neoplastic lesion of the prostate called "high-grade prostatic intraepithelial neoplasia (HGPIN)"; and 39 images from leiomyomas and leiomyoma variants, including cellular and epithelioid leiomyomas, of the myometetrium, and another 41 from leiomyosarcomas of the myometetrium. One example can be utilized to examine 6 slides each of high-grade serous, endometrioid and clear cell carcinomas of the ovary and 3 slides of mucinous carcinomas. In one example, images are Hematoxyline & Eosin (H&E)-stained sections, and scanned at ×50 magnification on a digital slide scanner. The color images can be transformed to grayscale using a custom transformation to train the classification scheme. The annotated regions can be further broken down into smaller overlapping blocks, such as containing 150×150 pixels.

Feature Representation and Machine Learning

Before analysis of tissue biopsy images, the high-resolution images are broken down into smaller sub-images, and represent each of these smaller regions by appropriate features. The features can include pixel intensities (grayscale or color values) or descriptors encompassing diverse features of the region. The complexity of the features can be complemented by the complexity of the classification schemes. In various examples, high accuracy can be achieved using powerful descriptors coupled with simple schemes or using complex schemes applied to simple features.

One example of a feature can include pixel values. The models learned using pixel features can provide interpretable information of representative image regions. More abstract features, however, may provide good discriminative power, but with low visual interpretability. One example of the present subject matter utilizes color-space representation for classifying cancerous tissue. In various examples, linear transformations or non-linear transformations of the existing color-space representations can yield good discrimination based on the training data.

Sparse modeling can be used in computer vision applications and in certain domains of machine learning. Dictionary learning methods can be used to learn discriminative models for image classification. Basic dictionary learning and discriminative dictionary learning techniques can be utilized for classification of pixel (intensity) features from image regions.

Dictionary Learning

The process of representing an output signal or a response as a linear combination of a set of input signals is called linear regression. These inputs form a dictionary or codebook. The corresponding set of regression coefficients may be dense if the response depends on many of the inputs. However, in many practical scenarios the output can be modeled by only a sparse subset of the inputs. Sparse linear regression, or sparse coding, represents a signal by a linear combination of a sparse subset of signals from a dictionary. It is a fundamental of the development of sparse linear models. The development of sparse representation models involves sparse coding and dictionary learning.

Sparse coding is mainly decomposing a given signal x in terms of sparse linear combination of atoms (columns) from a fixed (usually over-complete) dictionary D.

Given a sufficiently large set of training signals $X=\{x_i\}$, dictionary learning is the process to learn a sparsity-promoting, over-complete dictionary D and the corresponding sparse coefficients $A=\{\alpha_i\}$.

Given a signal x and the dictionary D, sparse linear regression is an attempt to find a decomposition $\alpha$ of the signal by a linear combination of a sparse subset of columns from the dictionary, called atoms. In one example, sparsity can be quantified by the '$l_0$" pseudo-norm', which is defined as the number of non-zero elements in a vector. Under this definition, the sparse coding problem is given by $$\min_{\alpha} \|\alpha\|_0 \quad (1)$$
$$\text{s.t.} \quad x = H\alpha$$

or, in a sparsity-constrained version.

$$\min_{\alpha} \|x - H\alpha\|_2^2 \quad (2)$$
$$\text{s.t.} \quad \|\alpha\|_0 \leq P$$

where P defines the maximum number of non-zero elements allowed in $\alpha$. As the '$l_0$-norm' is a non-convex function, solving for the exact optimum is not possible: solving this problem requires time exponential in the dimension of $\alpha$. Thus, a convex relation of the '$l_0$' constraint is introduced, involving regularization or constraint by using the '$l_1$' norm of the signal:

$$\min_{\alpha} \|\alpha\|_1 \quad (3)$$
$$\text{s.t.} \quad x = H\alpha$$

or written as $$\min_{\alpha} \|x - H\alpha\|_2^2 \quad (4)$$
$$\text{s.t.} \quad \|\alpha\|_1 \leq P \text{ or}$$

$$\min_{\alpha} \|x - H\alpha\|_2^2 + \lambda\|\alpha\|_1 \quad (5)$$

The K-SVD algorithm can be used to solve dictionary learning problems via a singular value decomposition approach. The K-SVD algorithm was developed by Aharon et al. to learn an over-complete dictionary D from a training set $X=\{x_i\}$. It is an iterative approach in which dictionary update and sparse coding stages are alternated, with the dictionary learning stage optimizing each atom sequentially. The algorithm is recognized for its speed of convergence and good results.

Sparse models can be used to classify or cluster data. Learning dictionaries for each class independently without information from the other classes can be compared to generative modeling, which may not be able to classify or cluster data with sufficient accuracy when there is a significant overlap in the feature space. Such a scenario calls for the use of discriminative modeling, where the learning should promote discrimination between the sparse models of each class. In other words, the dictionary learned for a certain class should provide good reconstruction for the signals from that class, and poor reconstruction for signals that do not belong to that class. Conversely, a signal from a certain class can be reconstructed by a dictionary of the same class, compared to all other class dictionaries.

Classification between healthy and cancerous tissues has been challenging due to the relatively small sample sizes and some potential semantic similarities across the two categories. Such a scenario calls for modification of the existing dictionary learning framework to add discriminative power in addition to their reconstructive capabilities, where the learning should promote discrimination between the sparse models of each class. This modified version can be called discriminative dictionary learning. This dictionary is capable of learning discriminative atoms or features by integrating a misclassification cost term into the objective function noted earlier in Equation 2. The reconstruction error between a given signal x and the learned dictionary D and the corresponding optimal P-sparse coefficient α* can be defined as:

$$R^*(x,D)=\|x-D\alpha^*(x,D)\|_2^2 \quad (6)$$

A dictionary $D_i$ associated to a class $C_i$ should have small reconstruction error $R^*(x, D_i)$ to this class, as it is "good" at reconstructing this class, but at the same time produces a large reconstruction error to all other classes. According to this assumption, a traditional softmax discriminative cost functions for each class to define a discriminative term in Equation 2:

$$C_i^\lambda(u_1, u_2, \ldots, u_N) \equiv \log\left(\sum_{k=1}^N e^{-\lambda(y_k - y_i)}\right) \quad (7)$$

By denoting $\{D_j\}_{j=1}^N$ as the set of N dictionaries associated to classes $C_1$ to $C_N$, and $\{R^*(x, D_j)\}_{j=1}^N$ the corresponding N different reconstruction errors, rewrite the objective function as:

$$\min_{\{D_j\}_{j=1}^N} \sum_{\substack{k \in C_i \\ i=1,\ldots,N}} C_i^\lambda\left(\{R^*(x_k, D_j)\}_{j=1}^N\right) + \lambda\gamma R^*(x_k, D_j) \quad (8)$$

γ≥0 is the trade-off between reconstruction and discrimination. Choosing a large value of γ leads the model leaning to the classical reconstructive one and loses its ability to discriminate.

Experimental Results

The diagnosis of endometrioid carcinoma is primarily based on architecture. A distinguishing architectural feature of well-differentiated endometrioid carcinoma includes markedly crowded, haphazardly oriented, confluent or cribriform glands. In contrast, proliferative endometrium is more widely and evenly spaced, tubular of spiral-shaped glands, whose long axes are parallel to each other and perpendicular to the endometrial surface. According to one example, extract 32×32 intensity patches (not the color information here) at 1× resolution from the images as features, and learn discriminative dictionaries. The basis atoms of the two dictionaries, here, learned for proliferative endometrium (FIG. 2A), and endometrioid carcinoma (FIG. 2B). The characteristic shape and structure in the two classes is well captured in the dictionary atoms for each class. The test image block is classified based on which dictionary gives the smallest reconstruction error using the fewest atoms.

TABLE 1

| | k-NN-RCD Accuracy |
|---|---|
| Mean (Std. Dev) % | 78.33 (0.38) |

Classification accuracy for discriminative dictionary learning of endometrioid carcinoma.

Region Covariance Descriptor

More complex feature descriptor such as region covariance descriptor can be used in computer vision and image analysis. For example, Region Covariance Descriptors (RCDs) integrate many of the low-level image features, such as color, gradient and filter responses, into an abstract feature space. As a novel region descriptor, RCD can be used for object detection and texture classification.

Let φ be a mapping between each pixel i of a given image I and an n-dimensional feature vector $x_i$, such that φ $(I,x_i,y_i)=x_i$, where $x_i \in R^n$, and $(x_i,y_i)$ represents the location the $i^{th}$ pixel. For a given image block R, construct an n×n covariance matrix $C_R$ to represent the feature vectors $\{x_i\}_{i=1}^{|R|}$ of all pixels in R. Equation 9 can be used to calculate the region covariance descriptor:

$$C_R = \frac{1}{|R|-1}\sum_{i=1}^{|R|}(x_i - \mu_R)(x_i - \mu_R)^T \quad (9)$$

Where $$\mu_R = \frac{1}{|R|}\sum_{i=1}^{|R|} x_i$$

is the mean vector of the whole region.

FIG. 3 illustrates an example of the region covariance descriptor using both color (I, $I_x$, $I_y$, $\sqrt{I_x^2+I_y^2}$) and spatial (x, y, p, θ) features.

Depending on different applications, the feature vector x could incorporate color information (either RGB or intensity value), and information about the first and higher order spatial derivatives of the image intensity.

The dissimilarity of two covariance matrices A and B can be measured by:

$$Dis_{geo} = \sqrt{\sum_{i=1}^n \log^2 \lambda_i(A, B)} \quad (10)$$

where $\lambda_i$ (A, B), i=1, . . . , n are the generalized eigenvalues of (A,B).

There are several benefits of choosing region covariances, as they are invariant to illumination, orientation and scale of the image region, depending on the features used and how the regions are defined. Some classification schemes for region covariances use the geodesic distance in a K-nearest-neighbor framework. The region covariance descriptor can be used to classify cancers under two different frames: the simplest nearest-neighbor frame and the support vector machine frame.

The k-Nearest Neighbors scheme (or k-NN) is a non-parametric method that can be used for classification tasks. The classifier itself includes many training examples that are vectors in a multidimensional feature space, each with a class label. The classification procedure includes finding the k closest examples around the object O. This object is then classified by a majority vote of its k neighbors, and assigned to the class most common among its k nearest neighbors.

FIG. 4 illustrates an example of k-NN classification. With k=3 (solid line circle), the test sample (center green circle) is assigned to the second class of red triangles, because there are two red triangles and only one blue square inside the circle. With k=5 (dashed line circle), the test sample is assigned to the first class of blue squares, because there are three blue squares and only two red triangles.

Although the k-NN framework is simple, it is memory-intensive and time-intensive. To overcome those drawbacks, consider a faster classification techniques such as support vector machines (SVMs). Given a set of training examples, each marked as belonging to one of two categories, SVM training builds a model that separates two categories by a clear gap that is as wide as possible. New examples are then mapped into the same space and predicted to belong to one of the two categories based on which side of the gap they fall on.

Let the training set S consist of a set of n points in the form of $$S=\{(x_i,y_i)|x_i \in R^m, y_i \in \{-1,1\}, \forall i=1 \ldots n\}. \quad (11)$$

where $y_i$ indicates the class to which the point $x_i$ belongs. Each $x_i$ is an m-dimensional vector. Next, find the maximum-margin hyperplane that divides the points having $y_i=1$ from those having $y_i=-1$. An hyperplane can be written as $$w \cdot x - b = 0. \quad (12)$$

where w represents the normal vector to the hyperplane and the term $$\frac{b}{\|w\|}$$

determines the offset. Hence, formulate the SVM as the following optimization problem:

$$\underset{(w,b)}{\text{minimize}} \frac{1}{2}\|w\|^2 \quad (13)$$

$$\text{subject to } y_i(w \cdot x_i - b) \geq 1 \; \forall i = 1, \ldots, n.$$

By substituting $w = \sum_{i=1}^{n} \alpha_i y_i x_i$ where $\alpha$ are the Lagrange multipliers, transform the original problem into its dual form:

$$\underset{\alpha}{\text{maximize}} \sum_{i=1}^{n} \alpha_i - \frac{1}{2} \sum_{i,j} \alpha_i \alpha_j y_i y_j x_i^T x_j \quad (14)$$

$$\alpha_i \geq 0, \forall i = 1, \ldots, n$$

$$\text{subject to } \sum_{i=1}^{n} \alpha_i y_i = 0.$$

In order to incorporate region covariance into SVM framework, rewrite the objective function into a kernel form:

$$\underset{\alpha}{\text{maximize}} \sum_{i=1}^{n} \alpha_i - \frac{1}{2} \sum_{i,j} \alpha_i \alpha_j y_i y_j k(x_i, x_j) \quad (15)$$

and introduce the radial basis kernel in the following form:

$$k(x_i,x_j) = \exp(-\gamma \|x_i - x_j\|^2) \quad (16)$$

where $\|x_i - x_j\|^2$ is the geodesic distance between two covariance matrices $x_i$ and $x_j$, and $\gamma$ is a parameter that is greater than zero and of a user selection.

Experimental Results

In both setups, select several texture features, i.e., image intensity I, the first order image gradients along both x and y direction Ix, Iy. and their magnitude $$\sqrt[2]{I_x^2 + I_y^2},$$

and the second order image gradients Ixx, Iyy, and Ixy. Comparing with the original image blocks, whose feature dimension is approximately 20,000 long (150×150), it provided a more compact feature space (at most 7×7=49). This is beneficial to expedite the analysis process while maintaining the analysis quality. Consider a 10-fold cross validation to test the performance of both classification schemes, which means one-tenth of the samples is used in testing, leaving the rest to build the classifier.

Consider an example of applying two different classification frameworks on leiomyomas vs. leiomyosarcomas. According to one example, obtain 4871 useful samples of leiomyomas and 5562 of leiomyosarcomas from 80 different subjects (80 different slides).

|  | k-NN-RCD Accuracy | SVM-RCD Accuracy |
| --- | --- | --- |
| Mean (Std. Dev) % | 96.0383 (0.5379) | 94.4539 (1.0012) |

Table 2 shows the average performance of both classifiers.

TABLE 2

|  | k-NN-RCD Accuracy | SVM-RCD Accuracy |
| --- | --- | --- |
| Mean (Std. Dev) % | 96.0383 (0.5379) | 94.4539 (1.0012) |

The accuracy of both k-NN classifier and SVM using 10-fold cross-validation is shown in Table 3.

TABLE 3

Confusion matrix of both k-NN classifier and SVM using 10-fold cross-validation

|  | k-NN-RCD | SVM-RCD |
| --- | --- | --- |
| TPR (True positive rate, %) | 94.94 | 94.4559 |
| TNR (True negative rate, %) | 98.21 | 96.8198 |
| FPR (False positive rate, %) | 1.79 | 3.1802 |
| FNR (False negative rate, %) | 5.06 | 5.5441 |

Allowing for the existence of two subclasses within leiomyomas: class A (regular leiomyomas) and class B (cellular and epithelioid leiomyomas). Pathologists sometime may confuse particular variants of leiomyomas with leiomyosarcomas, and end up with a false diagnosis. This misclassification is due to some structure similarities perceived by human eyes. Consider the ability of computer vision technique to distinguishing leiomyoma variants from leiomyosarcomas. Here, apply the classifiers (both k-NN and SVM) on leiomyoma variants vs. leiomyosarcomas, as well as regular leiomyomas vs. leiomyoscarcomas. Listed below are results for examples of particular tasks.

Task I: Type A vs. Type B

Consider an example including a total of 4084 samples from type A and 787 from type B. Since the numbers of the two classes are not well balanced (the size of type B dataset is much smaller), down-sample type A and randomly select 1000 samples from it. Perform 10-fold cross-validation using k-NN classifier, and the results are presented in

| k-NN-RCD Accuracy | Mean (Std. Dev) % |
| --- | --- |
| 10-fold cross-validation | 94.38 (1.4457) |

Table 4 and

TABLE 5

| These results show an agreement from the computer on the existence of sub-categories within leiomyomas, and show that computers have the power to distinguish A from B with high accuracy. | |
| --- | --- |
| | k-NN-RCD |
| TPR (True positive rate, %) | 93.2692 |
| TNR (True negative rate, %) | 95.9459 |
| FPR (False positive rate, %) | 4.0541 |
| FNR (False negative rate, %) | 6.7308 |

FIGS. 5A, 5B and 5C illustrate spatial distribution of different classes using ISOMAP. FIG. 5A illustrates Leiomyomas vs. Leiomyomas variants, FIG. 5B illustrates Leiomyomas vs. Leiomyosarcomas, and FIG. 5C illustrates Leiomyomas variants vs. Leioyosarcomas.

TABLE 4

| Accuracy of k-NN classifier on Type A (Leiomyomas) vs. Type B (Leiomyomas variants). | |
| --- | --- |
| k-NN-RCD Accuracy | Mean (Std. Dev) % |
| 10-fold cross-validation | 94.38 (1.4457) |

TABLE 5

| Confusion matrix of k-NN classifier on Type A (Leiomyomas) vs. Type B (Leiomyomas variants). | |
| --- | --- |
| | k-NN-RCD |
| TPR (True positive rate, %) | 93.2692 |
| TNR (True negative rate, %) | 95.9459 |
| FPR (False positive rate, %) | 4.0541 |
| FNR (False negative rate, %) | 6.7308 |

Task II: Type A vs. Leiomyosarcomas

Consider an example including 4084 samples obtained from type A and 5562 samples from leiomyosarcomas. Taking the time and space efficiency into consideration, randomly sample 1000 cases from each class, and perform k-NN classifier on those 2000 samples.

TABLE 6

| Accuracy of k-NN classifier on Type A (Leiomyomas) vs. Leiomyosarcomas. | |
| --- | --- |
| k-NN-RCD Accuracy | Mean (Std. Dev) % |
| 10-fold cross-validation | 96.00 (1.3385) |

TABLE 7

| Confusion matrix of k-NN classifier on Type A (Leiomyomas) vs. Leiomyosarcomas. | |
| --- | --- |
| TPR (True positive rate, %) | 94.1176 |
| TNR (True negative rate, %) | 97.9592 |
| FPR (False positive rate, %) | 2.0408 |
| FNR (False negative rate, %) | 5.8824 |

Task III: Type B vs. Leiomyosarcomas

Consider next, an example in which there are 787 samples from type B and 5562 samples from leiomyosarcomas. As before, randomly sample 1000 cases from leiomyosarcomas to perform k-NN classifier.

TABLE 8

| Accuracy of k-NN classifier on Type B (Leiomyomas variants) vs. Leiomyosarcomas. | |
| --- | --- |
| k-NN-RCD Accuracy | Mean (Std. Dev) % |
| 10-fold cross-validation | 97.1910 (1.1918) |

TABLE 9

| Confusion matrix of k-NN classifier on Type B (Leiomyomas variants) vs. Leiomyosarcomas. | |
| --- | --- |
| TPR (True positive rate, %) | 97.2222 |
| TNR (True negative rate, %) | 97.1698 |
| FPR (False positive rate, %) | 2.8302 |
| FNR (False negative rate, %) | 2.7778 |

An example of the present subject matter, utilizing computer vision, can be applied with high accuracy to the diagnosis of mesenchymal neoplasms, distinguishing among myometrial leiomyomas, leimyosarcomas, and leiomyoma variants. Human pathologists are sometimes misled by the atypical features of the leiomyoma variants, but these features do not affect the ability of the computer to distinguish them from leiomyosarcomas.

Consider applying the same scheme to differentiation between the four major types of ovarian carcinoma. This is a non-trivial task even for human pathologists based on histomorphology and often requires immunostains. One example of the present subject matter can distinguish between benign and malignant tissues and differentiate between the types of malignant tumors of the same organ. With a database size of 4500, one example provides an accuracy of 81% of differentiation among all 4 types of carcinoma, which can increase to 84% with the database size of 9000. In one example, the accuracy of differential diagnosis can be 90% between serous and endometrioid carcinomas, 93% between endometrioid and mucinous carcinomas and 94% between serous and clear cell carcinomas.

Tensor Dictionary Learning

Another classifier is "tensor" dictionary learning on region covariance features. The tensor dictionary learning attempts to decompose a positive definite matrix C by a linear combination of the dictionary atoms:

$$C \cong A_1 x_1 + A_2 x_2 + \ldots + A_k x_k = \sum_{i=1}^{k} A_i x_i \triangleq \hat{C} \geq 0 \quad (17)$$

This requires the coefficient vector x to be non-negative, and the approximation $\hat{C}$ to be positive definite. In addition, consider imposing a '$l_0$' "pseudo-norm" constraint on x to enforce a sparse linear representation:

$$\|x\|_0 \leq Q \quad (18)$$

The optimization problem of the tensor sparse coding is defined to minimize the Log Det divergence $D_{Log\ Det}(\hat{C}, C)$ between the approximation $\hat{C}$ and the given matrix C:

$$D_{Log\ Det}(\hat{C},C)=tr(C^{-1}Ax)-\log \det(C^{-1}Ax)-n. \quad (19)$$

Under the similarity map $X \to C^{-1/2} X C^{-1/2}$, where X is the argument of the trace or log det, the objective function stays unchanged:

$$D_{LogDet}(\hat{C}, C) = tr(C^{-1/2}(Ax)C^{-1/2}) - \log\det(C^{-1/2}(Ax)S^{-1/2}) - n \quad (20)$$
$$= tr(\hat{A}x) - \log\det(\hat{A}x) - n,$$

where $\hat{A}=\{\hat{A}_i\}_{i=1}^{K}$, and $\hat{A}=C^{-1/2}A_iC^{-1/2}$. This similarity transform can reduce the problem into a canonical form and improve numerical stability. By linearity of the trace, set d: $d_i=\hat{A}_i$, and discard the constant term n, and define:

$$f(x)=D_{Log\ Det}(\hat{C},C)=d^T x-\log \det(\hat{A}x). \quad (21)$$

Impose a constraint on the residual $R=c-\hat{C}$ to be positive semidefinite if using the above equation to learn the dictionary A. This requires the minimum eigenvalue of the residual $\lambda_{min}(R)=\lambda_{min}(C-\hat{C})\geq 0$: prefer this to be as close to zero as possible.

$$\hat{C}=Ax \leq C \text{ or } \hat{A}x \leq I_n, \quad (22)$$

where $I_n$ represents the n×n identity matrix. Combine equation (17) with Equation 22 and get:

$$0 \leq \hat{A}x \leq I_n. \quad (23)$$

Notice that the $l_0$ sparsity constraint in Equation 18 is non-convex: replace it with $l_1$ norm of x, which is its closest convex relaxation. Under some assumptions, minimizing the $l_1$ penalty yields equivalent results as minimizing $l_0$ norm of x in sparse vector decompositions. Here is the optimization problem constructed by putting the objective function and all the constraints noted above:

$$\min_{x \geq 0} d^T x - \log\det(\hat{A}x) + \lambda \|x\|_1 \quad (24)$$
$$\text{s.t. } 0 \leq \hat{A}x \leq I_n,$$

where $\lambda \geq 0$, and by tuning this parameter, find a balance between a sparser representation and a more accurate reconstruction. With $x_i$'s to be non-negative, the $l_1$ norm of x becomes the summation of all components of x.

$$\|x\|_1 = \sum_{i=1}^{N} x_i, \quad (25)$$

and by letting $\hat{d}_i=d_i+\lambda$, simplify the optimization problem as:

$$\min_{x \geq 0} \hat{d}^T x - \log\det(\hat{A}x) \quad (26)$$
$$\text{s.t. } 0 \leq \hat{A}x \leq I_n,$$

Or compose the $l_1$ norm of x as a hard constraint instead of a penalty term in the objective function, and rewrite the optimization problem as:

$$\min_{x \geq 0} c^T x - \log\det(\hat{A}x) \quad (27)$$
$$\text{s.t. } \sum_{i=1}^{N} x_i \leq K$$
$$0 \leq \hat{A}x \leq I_n,$$

Denote the former setup as Type I (l1—regularized) and the latter setup as Type II (l1—constrained).

Given a training set $C=\{C_j\}_{j=1}^{M}$, $C_j \in S_{++}^n$, the problem of learning the dictionary $H=\{H_i\}_{i=1}^{K}$, $H_j \in S_{++}^n$ can be formulated as:

$$\min_{H,X} \sum_{j=1}^{M} D_{ld}(Hx_j, C_j) + \lambda \|x_j\|_1 \quad (28)$$
$$\text{s.t. } x_j \geq 0 \quad \text{for } j=1,\ldots,N$$
$$H_i \geq 0 \quad \text{for } i=1,\ldots,K$$
$$\|H_i\|_F^2 \leq 1 \quad \text{for } i=1,\ldots,K$$
$$Hx_j \geq 0 \quad \text{for } j=1,\ldots,N$$

Use $x_j$ to denote the $j^{th}$ column of coefficient matrix X. Considering the requirement of normalizing each atoms by their Frobenius norm, and the constraint $\|H_i\|_F^2=1$ is non-convex, relax this constraint by $\|H_i\|_F^2 \leq 1$ to make it convex here.

Notice that there will be no unique minimizer (H*, X*) existing in this dictionary learning problem as it is non-convex in (H, X). However, if either argument is fixed, the whole problem is convex in the other. This observation leads to choosing the alternating minimization approach to find a stationary point of this optimization problem. This approach includes repeating the following:

(1) Fix C and H, solve for X.
(2) Fix C and X, solve for H.

The first is the sparse coding of the training set C, and the second updates the dictionary atoms while keeping the sparse coefficients fixed. Denote the first as sparse coding in the dictionary learning problem, and the second as the dictionary update. Update one dictionary atom Hi in H at a time, and only allow the corresponding non-zero coefficients of Hi to change in value, leaving the rest fixed. By sequentially performing this procedure, update $H_i^{k-1}$ to $H_i^k$ at iteration k, given $\{H_1^k, H_2^k, \ldots, H_{i-1}^k, H_{i+1}^{k-1}, \ldots,$ $H_M^{k-1}$)} and $X^k$. The detailed procedure of the dictionary learning can be summarized in Table 10.

TABLE 10

Tensor Dictionary Learning
Dictionary learning - 1

Input: Data C = $\{C_j\}_{j=1}^N$, dictionary size M, sparsity parameter λ
Output: H = $\{H_i\}_{i=1}^M$
   k = 0
   Initialize $A_0$ by sampling from C
   Repeat
      k <-- k+1
      Given C and $A_{k-1}$, compute the sparse coefficients $X_k$
      for i = 1 to M, do
         Update atom $H_i^{k-1}$ to $H_i^k$, along with the corresponding coefficients in $X_k$
      End
until converge

EXPERIMENTAL

Tensor dictionary learning can be applied to carcinoma of the breast using an example with more than 6,000 labeled training patches of RCDs for both classes. Tensor dictionary learning can provide an accuracy of 85.93%.

TABLE 11

Accuracy of Tensor Dictionary classifier on carcinoma of the breast.

| Tensor DL-RCD Accuracy | Mean (Std. Dev) % |
|---|---|
| 10-fold cross-validation | 85.93 (0.32) |

FIGS. 6A, 6B, and 6C illustrate an example of using tensor dictionary learning to detect carcinoma of the breast. FIG. 6A shows the original tissue section image whose center has been annotated as carcinoma in FIG. 6B. FIG. 6C illustrates a prediction result obtained by one example. Regions in green have been misclassified as benign, and occurred mostly around the edges. In practice, even the most skillful pathologist might find it difficult to allocate the exact boundaries of a region of carcinoma from its surroundings. The hole in the illustrated section results from a previous mechanical disruption of the tissue and is unrelated to this example.

Microscopic morphologic diagnosis by a human has been the mainstay of pathology, and it remains so today. An example of the present subject matter utilizes computer vision to aid in surgical pathology diagnosis. Computer vision, as described herein, can accurately distinguish carcinomas of several organs from benign tissues, recognize benign and malignant mesenchymal tumors of the uterus, and differentiate between several major types of ovarian carcinoma. Region Covariance Descriptors technique is a method for approaching surgical pathology, showing that it can be a tool to assist and advance this medical field.

Part 2: The Use of Computer Vision for the Diagnosis of Benign and Malignant Smooth Muscle Neoplasms of the Uterus.

In various examples, the present subject matter includes image processing and machine learning techniques for segmenting and detecting cancerous regions in high-resolution images of tissue slides, and distinguishing them from benign regions.

In various examples, the present subject matter can expedite the diagnosis process through segmenting the diseased tissue, provide additional evidence to assist in disease identification, and provide insight into disease morphology through interpretable explanation of computer models.

Existing technologies for analyzing histopathologic slides rely on the detection of RGB-colored objects (MATLAB), or the detection of multiple low-level image features (color, texture, borders, etc.) and performing machine learning analysis on the collected features to find a combination of features with the best fit for the learning model (GENIE from Los Alamos National Laboratory). Such rule-based learning on which the existing production-level technologies rely appears to have limited success, and some of the existing techniques have a low potential for fine-tuning.

In contrast, the present subject matter utilizes computer vision to assess the histopathologic samples. An example of the present subject matter provides a computer vision system that does not use rule-based learning and can achieve superior results and a high adaptation to morphologic variants of the diseases.

In various examples, the present subject matter includes a machine learning scheme to effectively classify benign tissue and cancerous tissue, as well as to distinguish between the different types of smooth muscle tumors. A variety of different approaches can be implemented and one example includes a graphical user interface to facilitate data annotation.

Various technologies have been used to provide physiological imaging. For example, magnetic resonance imaging, ultrasonic technologies, and x-ray imaging have all been used to provide analysis of the breast. For instance, low-dose X-ray system—mammography—has been considered as an effective method in the early breast cancer detection. Hence, computer-aided diagnosis (CAD) systems based on mammography has attracted great attention in the research field. According to the type of mammography such system used, it can be divided into two categories: conventional file mammography and digital mammography. Even though digital mammographic CAD systems have a higher signal-to-noise ratio, a wider dynamic range, and a higher contrast sensitivity than conventional system, it appears that there is no significant performance difference between the two. Many techniques have been introduced to CAD systems, aiming to detect abnormalities in mammograms. Selected concepts behind those techniques can be summarized into the following aspects:

A. For detecting microcalcifications (MC) clusters: One indicator of breast cancer is clustered MCs which are small bright spots in mammograms, accumulated by calcium. Some work has been conducted to develop methods to automatically detect MCs in mammograms. Such detection methods can be divided into four categories: 1) based on image enhancement; 2) based on stochastic modeling; 3) based on multiscale decomposition; and 4) based on machine learning.

B. For detecting masses in mammograms: A mass, which is a space-occupying lesion seen in more than one projection, can be characterized by its shape and margin. In general, a mass with regular shape is more likely to be benign whereas a mass with irregular shape is more likely to be malignant. Current mass detection algorithms include two stages: 1) to detect suspicious regions on the mammogram which could be either pixel-based or region based, and 2) to classify those suspicious regions as mass or normal tissue.

C. For detecting architectural distortion in mammograms: Architectural distortion includes spicularions radiating from a point and focal retraction or distortion at the edge of the parenchyma. It could be considered as the third common sign in mammograms to indicate breast cancer. Some research concerns oriented texture patterns by applying Gabor filters and phase portrait maps; distinguishing ROIs exhibiting architectural distortion using the Hausdorff fractual dimension and an SVM classifier; and using mathematical morphology.

D. For detecting bilateral asymmetry in mammograms; A sign used by radiologist to diagnose breast cancer is the asymmetry between the left and right mammograms. Before executing asymmetry analysis, some types of alignment of the left and right breast images are preferred. Comparison between the left and right breast mammograms could be composed in terms of shape, texture, and density.

Part 3: The Use of Computer Vision for the Diagnosis of Benign and Malignant Smooth Muscle Neoplasms of the Uterus and Other Tissue.

Computer vision methods to diagnose epithelial neoplasms, including carcinomas of the endometrium, prostate and breast, can be used for the analysis of benign and malignant mesenchymal neoplasms, leiomyomas and leiomyosarcomas of the myometetrium.

Ordinarily, a human surgical pathologist would use histopathologic features, including tumor cell necrosis, high-grade nuclear atypia and increased mitotic activity, to distinguish leiomyosarcomas from leiomyomas. Leiomyoma variants, such as cellular and epithelioid leiomyomas, can superficially resemble leiomyosarcomas and thus present a diagnostic challenge of distinguishing them from the true malignant smooth muscle tumors of the uterus.

One approach, here called Region Covariance Descriptors (RCD) can be used to distinguish leiomyomas (cellular leiomyomas and epithelioid leiomyomas) and leiomyosarcomas.

One example can include analysis of digital images of hematoxylin-stained and eosin-stained sections of, for example, 39 myometrial leiomyomas and 41 leiomyosarcomas, scanned at ×50 magnification on a digital slide scanner. The leiomyomas can be further subdivided into 32 conventional leiomyomas and 7 leiomyoma variants, including cellular and epithelioid types. Each image can be annotated using the annotation graphical user interface (described elsewhere in this document) and stored in 150×150-pixel image blocks. The yield can be 10533 useful blocks from all classes. A k-nearest neighbor (k-NN) classification can be applied using region covariance features.

The features selected included I (intensity of the image), Ix. Iy (gradient of the image along x and y axis) and $\sqrt{(Ix2+Iy2)}$ (its magnitude), ignoring the spatial information $(x,y,\rho,\ominus)$. This provides a smaller feature space and accelerated analysis while still maintaining quality. A 10-fold cross-validation can be applied to test the performance of the k-NN classifier. One-tenth of the samples can be used as test samples, leaving nine-tenths to build the database. A Support Vector Machine (SVM) can be used on the region covariance features using the same setup as k-NN classifier, fitted with the Radial Basis Function kernel to cooperate covariance features. SVM is a type of model-based classifier that searches for the Maximum Margin Hyperplane that best separates two classes and at the same time provides the largest distance to the nearest training data point of any class.

The annotation graphical user interface (GUI), presented elsewhere in this document, is simple and intuitive and does not require advanced computer knowledge to operate and facilitates training computer vision schemes for tasks in surgical pathology.

FIGS. 7A-7C illustrate tissue images and user-selected regions for consideration. FIG. 7A illustrates a Leiomyoma in magnified and unmagnified detail. FIG. 7B illustrates a Cellular Leiomyoma in magnified and unmagnified detail. FIG. 7C illustrate a Leiomyosarcoma in magnified and unmagnified detail.

Application of an RCD processing as described herein yields the two-dimensional graph results shown in FIGS. 8A, 8B, and 8C. FIG. 8A illustrates classification as leiomyomas and as cellular leiomyomas, according to one example. FIG. 8B illustrates classification as leiomyomas and as leiomyosarcomas, according to one example. FIG. 8C illustrates classification as cellular leiomyomas and as leiomyosarcomas, according to one example. In the graphs presented herein, the categories appear to overlap in this two-dimensional graph however they are distinct in the multidimensional space used by the RCD process.

FIG. 9 illustrates a graph depicting accuracy and number of nearest neighbor for various block sizes, according to one example. In the data illustrated, a block size of 150×150 provides a good resolution for distinguishing the diagnostic categories.

According to one example, the overall accuracy of distinguishing leiomyomas from leiomyosarcomas was 96.04% by the k-NN method and 94.45% by region covariance features with SVM support. Using the k-NN method, the accuracy of separating conventional leiomyomas from leiomyoma variants was 94.38%. Using the k-NN method, the accuracy of distinguishing conventional leiomyomas and leiomyoma variants from leiomyosarcomas was 96.00% and 97.19%, respectively. Tabulated results are presented in FIG. 10, according to one example.

Computer vision can be applied with high accuracy to the diagnosis of mesenchymal neoplasms, distinguishing myometrial leiomyomas from leimyosarcomas and leiomyoma variants from conventional leiomyomas. Human pathologists can sometimes be misled by the atypical features of the leiomyoma variants, but these features do not affect the ability of the computer to distinguish them from leiomyosarcomas.

Part 4: Evaluation of Feature Descriptors for Cancerous Tissue Recognition.

Computer-Aided Diagnosis (CAD) can provide automated tools for the analysis of medical images. In surgical pathology, such tools enhance the diagnosing capabilities of pathologists by allowing them to more efficiently review and diagnose a larger number of cases.

An example of the present subject matter is directed to computer vision based feature descriptors for recognizing cancerous tissues in histopathologic images. Images of Hematoxylin and Eosin-stained microscopic sections of breast and prostate carcinomas, and myometrial leiomyosarcomas, are used in some examples. Selected feature representations are considered for this task. Various image descriptors are compared, including representations based on convolutional neural networks, Fisher vectors, and sparse codes. Covariance-based descriptors show good performance on the three types of cancer considered. Covariance descriptors can be effective for texture recognition. In one example covariance descriptors are configured for the noted task and evaluated against deep learning models. In one example, Region Covariance Descriptors (RCDs) provides a powerful image descriptor for purposes of cancerous tissue recognition. Covariance Kernel Descriptor (CKD) can outperform other image representations. Experimental data can show that using CKD provides 92.83%, 91.51%, and 98.10% classification accuracy for the recognition of breast carcinomas, prostate carcinomas, and myometrial leiomyosarcomas, respectively.

The successful treatment of cancer requires early and accurate diagnosis. This requires close examination of tissue slides from suspected regions under a microscope—a task which is often very time consuming, thus limiting the number of cancer cases that experts can handle daily. Given that hospitals and clinics are facing a continuously increasing number of such cases, while the number of expert pathologists for the task is limited, automated tools, with the ability to confidently identify prospective cancerous regions, can assist the pathologists and immensely speed up the diagnosis.

An example of the present subject matter includes a CAD scheme for expediting the analysis of Hematoxylin and Eosin (H&E)-stained tissue samples. H&E staining is a technique in pathology where Hematoxylin will stain the nuclei in blue or dark purple color, while Eosin imparts a pink or lighter purple color to the cytoplasm, as depicted in FIG. 1 (of this Part) for the considered types of tissue. An automated identification of the regions that are highly likely to be cancerous, can assist experts in finding them among the surrounding benign tissues efficiently, resulting in faster diagnosis.

FIG. 11 illustrates stained samples for three types of tissue, according to one example. In particular, the figure shows Hematoxylin & Eosin-stained samples for breast tissue (rows 1 and 2), prostate tissue (rows 3 and 4) and myometrium tissue (rows 5 and 6).

Discriminative image representations can be evaluated for classifying a benign image patch from a cancerous one. A variety of feature descriptors can be considered for computer vision applications, including object recognition, texture recognition, and shape discrimination. Presented herein is a comparison of feature descriptors such as Histograms of Oriented Gradients (HOG) and Gabor wavelets, and representations based on Convolutional Neural Networks (CNN). Fisher Vectors (FVs), sparse codes and Region Covariance Descriptors (RCDs). Of these, RCD, which fuses raw image features (such as image intensity and gradients) into a compact positive definite matrix, is simple to generate. One example, referred to as Covariance-Kernel Descriptor (CKD), entails combining RCD with a positive definite kernel matrix generated from color histograms. RCD and CKD, when combined with a suitable non-linear geometry, can provide good classification performance for the task against other descriptors.

An example of the present subject matter allows segmentation of the nuclei without requiring a pre-processing step since global image descriptors are used. This allows an example of the present subject matter to operate without being constrained by grading systems (e.g., Gleason grading system for prostate cancer), making it extensible to other types of cancer by a suitable training procedure.

An example of the present subject matter can be evaluated by constructing datasets for three types of cancer, namely (i) breast, (ii) prostate, and (iii) myometrium. To this end, microscopic images from H&E stained sections from malignant and benign regions can be used for each of these tissue types. Data collection process is described herein. Comparisons of the various feature representations using different evaluation metrics are presented herein. Consider some computer vision based approaches to cancerous tissue recognition.

Several techniques have been considered for detection of cancerous segments in various types of medical images. Classification of cancerous regions on histopathological images can be performed at the level of the tissue architecture, as well as at the nuclear level. In general, the intensity of each pixel and its spatial dependence is used as an image descriptor. These features can be further categorized based on: 1) intensity (i.e., density, hue, mean, median, and variance), 2) morphology (i.e., area, center of mass, concavity, minor axis, and major axis), and 3) texture (i.e. co-occurrence features, fractal dimension, run length feature, and Gabor wavelets).

Run length is defined as the number of consecutive pixels with the same intensity value in a given direction. Features are extracted from the gray-level run-length matrix, which is then used to count the total occurrences. A system for prostate cancer detection can use a run-length matrix. Feature co-occurrences is another strategy for generating descriptors for cancer detection. Systems to classify liver cancer and prostate cancer can use co-occurrence features.

Other approaches utilize features based on signal processing, such as filtering and transformations to the frequency domain. For example, Sobel filters, in the x, y, and two diagonal axes can be used. A Kirsch filter, as well as gradients in the x and y directions is another approach. In addition, Gabor wavelets may be used for discriminating cancer tissues. Other methodologies include using Deep Learning. Bag of Visual Words representations, and Haar features. Both morphological and texture features may allow nuclei classification including Daubechies and Gabor Wavelets.

With selection of suitable features, machine learning based classification schemes can be used for cancer diagnosis. Consider a comparison between different classification schemes for prostate cancer diagnosis. In one example, an ensemble of two SVMs can be used for detecting prostate cancer using cytological and textural features.

Computer vision feature representations can be used for vision tasks including use on medical images, which offers a more controlled and high-impact setting. One example of the present subject matter considers image representations in a systematic way on a diverse collection of data in the context of medical imaging. This document includes a discussion of the information content captured.

Data from three types of cancer is considered, namely carcinomas of the prostate, the breast, and the myometrium. The tissue samples collected are H&E-stained, followed by high-resolution (10K×9K pixels) scans of tissue sections taken at ×50 magnification on a digital slide scanner. A medical expert (such as a surgical pathologist) can provide annotations corresponding to the malignant and benign image regions. The annotated regions are divided into smaller disjoint patches of 150×150 pixels.

Next, binary class labels are assigned to each of the image patches. That is, those patches for which more than 80% of the pixels correspond to carcinomas, are treated as the positive class, while patches in the negative class are devoid of any cancerous regions. For one example, and in the case of prostate cancer, 31 images of carcinomas and 8 images from benign regions are annotated, taken from 10 patients. A balanced dataset for training and testing purposes is generated, containing 3500 image patches with 1750 patches depicting cancerous regions, while the other 1750 corresponding to benign regions. For the case of carcinomas of the breast, consider 21 annotated images of carcinomas and 19 images of benign tissue, taken from 21 patients. Similarly consider a dataset of 3500 randomly selected image patches of which, 1750 depicted cancerous cases while the other half corresponded to benign cases. In another example, 39 myometrial leiomyomas are combined with 41 images of leiomyosarcomas to construct the third dataset from 39 patients. In one example, randomly select 1539 cancerous image patches and combine them with 1782 benign patches to total a dataset of 3321 samples.

Towards an accurate classification between benign and malignant tissues, several types of feature representations can be evaluated. First, consider the naïve representation using the raw pixel intensities of gray-scale image patches. In that way, for an n×n image patch, a vectorial representation of size $n^2$ is derived by concatenating the columns of the patch. It appears that such a representation fails to capture invariances (such as pixel color and spatial locations) that can be useful for classification between benign and malignant tissue types. This is substantiated by training a classifier on such vectorized images. In view of this shortcoming, consider a more powerful feature representations.

FIGS. 12A, 12B, 12C, and 12D illustrate a low dimensional embedding using tSNE for the myometrium dataset using (a) Normalized Color Histograms (b) Covariance Descriptors (c) Covariance Kernel Descriptors and (d) CNN features. These figures are explained in the following section.

Normalized Color Histograms (NCH)

Color histograms consisting of 256 bins can be computed for each of the R, G, and B color channels; this histogram is normalized to sum to one and concatenated to form a 768-dimensional feature descriptor for the respective patch. This representation is depicted in the plot of FIG. 12A. FIG. 12A illustrates a low-dimensional embedding of these features using the t-Distributed Stochastic Neighbor Embedding (t-SNE) method, which depicts a coherent cluster formation as also supported by the experimental evaluation.

Region Covariance Descriptors

RCDs can be applied in computer vision. In contrast to the typical high-dimensional feature descriptors that often assume a flat Euclidean geometry, RCDs are generally low-dimensional and are assumed to belong to a highly non-linear geometry. In their basic form, RCDs are generated as described in Equation 29, where $f_i \in \mathbb{R}^d$, are d-dimensional features extracted from each pixel $i \in \{1, 2, \ldots, N\}$ of an image patch, and $\mu$ is the mean feature given by $\mu = 1/N \sum_{i=1}^{N} f_i$.

$$C = \frac{1}{(N-1)} \sum_{i=1}^{N} (f_i - \mu)(f_i - \mu)^T. \tag{29}$$

RCDs are covariance matrices computed over a set of features extracted from every pixel in the image patch. In this paper, consider a 5-dimensional RCD including the normalized intensities of the three channels R, G, and B of a color image combined with first-order gradient information along the x and y axis, as denoted by $G_i^x$ and $G_i^Y$ respectively. That is, $f_i$ has the following form:

$$f_i = [R_i G_i B_i G_i^x G_i^y]^T. \tag{30}$$

Covariance matrices are symmetric positive definite (SPD) matrices. Given that SPD matrices form an open subspace of the Euclidean space, it is natural to assume a Euclidean geometry to these matrices. However, assuming a non-linear geometry is often beneficial practically. That is, instead of using a Euclidean distance to measure the similarity between two SPD matrices, a non-linear measure is used which governs the geometry of the space of these matrices. Two such measures are (i) the Log-Euclidean Riemannian metric, and (ii) the Jensen-Bregman Log det Divergence. Of these two, (i) defines a Riemannian geometry to the space of SPD matrices, while (ii) defines an information geometry based similarity measure.

The Log-Euclidean Riemannian Metric (LERM) is described in Equation 31 for a pair of covariance matrices $C^{(i)}$ and $C^{(j)}$. In Riemannian geometry, the set of symmetric matrices form a tangent space for the Riemannian manifold of SPD matrices, and the space of symmetric matrices is isomorphic to the Euclidean space. Thus, taking the matrix logarithm, as in Equation 31, embeds the SPD matrices into a flat tangent space of symmetric matrices on which the usual Euclidean distance can be used for similarity computations.

$$D_{LERM}(C^{(i)}, C^{(j)}) := \|\text{Log}(C^{(i)}) - \text{Log}(C^{(j)})\|_F, \tag{31}$$

where $\text{Log}(\bullet)$ is the matrix logarithm and $\| \|_F$ is the Frobenius norm.

The Jensen-Bregman Log Det Divergence (JBLD), first proposed by Cherian et al., is also considered for similarity computations, as presented in Equation 32. In contrast to LERM, JBLD retains the rich non-linear geometry of the space of SPD matrices, and at the same time is computationally cheaper as the matrix logarithms are replaced by matrix determinants which can be computed efficiently via Cholesky factorization. Computing a 2-dimensional embedding for the myometrium dataset, can visually support the meaningful cluster formation when capitalizing on RCDs, as depicted in FIG. 12B.

$$D_{JBLD}(C^{(i)}, C^{(j)}) := \left[\log\left|\frac{C^{(i)} + C^{(j)}}{2}\right| - \frac{1}{2}\log\left|C^{(i)}C^{(j)}\right|\right]^{1/2}, \tag{32}$$

where |A| is the determinant of SPD matrix A.

Covariance-Kernel Descriptors

Capitalizing on the information captured by the RCDs and the NCHs, combine the two representations towards deriving a stronger descriptor. Recall that the RCDs compute the feature correlations between each pixel in the patch against other pixels; thus capturing texture and shape in the patch implicitly. However, RCDs make an implicit dependency between the attributes of a pixel and the pixel location in the patch. While this dependency can help for cancerous tissue recognition, sometimes spatial invariance of the color histograms is more important as suggested by the NCH descriptor above. Thus, both RCDs and NCHs capture complementary cues for recognition, and thus provide a synergy to the overall accuracy.

One example of the present subject matter includes a fusion of RCDs and NCHs to generate a Covariance-Kernel Descriptor (CKD) as follows. Generate a compact block diagonal symmetric positive definite matrix descriptor that contains in its first block the RCD denoted by C as computed in Equation 29, while the second block captures the correlations between the histograms computed on the three color channels of the image patch (as in the NCH). However, rather than concatenating the three histograms, combine them to formulate a matrix $H \in \mathbb{R}$, where each row corresponds to the b-bin histogram on a channel. The resulting CKD matrix is as follows:

$$CKD = \begin{bmatrix} C & 0 \\ 0 & HH^T \end{bmatrix}, \quad (33)$$

where 0 is a 3×3 matrix of all zeros.

Given that the 3×3 histogram correlation matrix $HH^T$ is positive definite (and thus a valid Mercer kernel), consider improving its representational power by computing the correlations via a kernel function. That is, suppose $h_c \in \mathbb{R}^b$ denotes a histogram vector (where $c \in \{R, G, B\}$), then replace the Gram matrix $HH^T$ in Equation 33 by a kernel matrix K defined by $K(h_{c1}, h_{c2}) = \phi(h_{c1})^T \phi(h_{c2})$ for c1, c2 $\in \{R, G, B\}$ and a kernel function $\phi$. However, consider an example in which the linear kernel is used. Note that the resulting fused descriptor is still an SPD matrix and thus, use the similarity measures defined for the RCD for CKD as well. A 2-dimensional embedding for the dataset of the myometrium depicts the cluster separability when capitalizing on CKDs, as depicted in FIG. 12C.

Bag of Visual Words

Bag Of visual Words (BOW) representation relies on the creation of a codebook which compactly characterizes a collection of local point features. In one example, consider BOW on Scale Invariant Feature Transform (SIFT) descriptors. For each type of tissue, randomly select 1000 image patches and compute a collection of 128 dimensional SIFT descriptors for each patch. For generating the codebook for each type of cancer, cluster the extracted SIFT descriptors using K-Means in 300 clusters. The resulting centroids after clustering are used as the codewords. To encode a patch in terms of the generated codebook, first extract it's SIFT descriptors from the patch, followed by generating a 300 dimensional histogram depicting the frequency by which these descriptors are assigned to the most similar codewords. This histogram is normalized to sum to one, thus depicting a discrete probability distribution, and is used as an encoding of the image patch.

Sparse Codes

Sparse coding enables construction of informative representations of data as linear (in most cases) combinations of a few representative "learned" atoms. In one example, start by learning a matrix of atoms, dubbed a dictionary matrix, for each type of tissue using the SPAMS library. In one example, the size of the patches (150×150) is prohibitive to allow learning a dictionary. To circumvent this concern, divide each patch into 100 smaller patches of size 15×15. Working with this 225-dimensional vectorized representations for the smaller patches, learn a dictionary of 1500 atoms. Note that the data is normalized to have zero mean and unit norm before training the dictionary. Given a test patch of size 150×150, repeat the process and generate 1500-dimensional sparse codes for each 15×15 patch by solving a Lasso objective. This precedes aggregating the sparse codes via average pooling, thus generating 1500-dimensional descriptors for the full image patch.

Gabor Features

Gabor-based features can be useful for cancerous tissue recognition. According to one example, generate a bank of Gabor filters at different orientations and scales. Particularly, present results based on a Gabor space constructed by convolutions in 4 orientations (0°, 45° and 90°, 135°) and 4 scales with a kernel size of 7×7 pixels. These parameters can be selected via cross validation on a subset of the dataset. After gray-scale images are convolved with the selected filters, they are down sampled by a factor of 4 and vectorized. Next, the resulting vectors for all filters are concatenated together to form a 23,104-dimensional descriptor.

Histogram of Oriented Gradients

HOG descriptors are computer vision descriptors that can capture shapes in images and are useful for object recognition and person detection tasks. A HOG descriptor is generated by dividing an image patch into a set of non-overlapping cells, followed by computing a histogram of intensity gradients in each cell. In one example, through a trial and error process select a cell size of 6×6 pixels, while 31 bins are used to produce the histogram for each cell. The VL-FEAT toolbox can be utilized to compute the HOG descriptors for experiments based on the aforementioned characteristics, producing a 19,375-dimensional descriptor.

Fisher Vectors

Fisher vectors (FVs) provide an enhancement over the BOW model in a probabilistic/information geometric. Instead of using a hard clustering scheme (such as K-Means) on the SIFT descriptors, FV uses probabilistic clustering using Gaussian Mixture Models (GMM). Furthermore, note that the gradient of the log-likelihood of the GMM with respect to the parameters of the component Gaussian distributions provides the direction in which the model parameters are to be adjusted to better approximate the data. This gradient is also related to the Fisher information matrix when the space of GMMs is regarded as a Riemannian manifold (and hence the name). In some examples, use 300 Gaussians to represent feature descriptors which resulted in a 76800-dimensional representation. Here again, the VL-FEAT toolbox can be used for computations.

Deep Learning

A pursuit of deep Convolutional Neural Networks (CNNs) is learning optimal transformations of the data that enhance the separability between classes. A concise outline of the domain on Deep Learning and CNNs is available. However, CNNs consist of millions of parameters and thus demand large corpus of data to train them effectively, which can be daunting for some tasks. With the data limited to a few thousand samples, consider modifying a pre-trained CNN model. In that way, allow the fully connected layers of the network to continue learning while the convolutional layers are restricted from learning at the same pace by significantly lessening their learning rates.

In view of the accuracy demonstrated on the Imagenet object classification benchmarks, for this work, consider using the Alexnet topology within the Caffe framework. In addition to the accuracy, this topology is also significantly less demanding on GPU memory, thus avoiding requirements for sophisticated hardware. A 2-dimensional embedding for the myometrium dataset, visually supports the informativeness of representations generated by the CNN, as depicted in FIG. 12D.

EXPERIMENTAL

To assess the discriminatory power of the selected representations, conduct a series of experiments within a supervised classification framework. In particular, consider comparisons using 5-Nearest Neighbors (5-NN) classifiers. Support Vector Machines (SVMs), as well as a linear classifier at the last layer of the deployed CNN. For the learned models, evaluate the classification performance using two different metrics, namely (i) classification accuracy (ACC), and (ii) the Area Under the Curve (AUC) computed from Receiver Operating Characteristic (ROC) curves. To produce more generalizable conclusions, use a 10-fold cross-validation for all experiments.

For SVM based experiments, consider an example using the libSVM library. For RCDs and CKDs, use the Radial Basis Function (RBF) Mercer kernels based on the LERM and the JBLD measures. For the rest of the tested descriptors, a collection of different kernels and parameter configurations can be tested. In particular, the tested kernels were linear, polynomial, RBF and Sigmoid. For almost all feature representations, linear kernels achieved the highest performance and can be used to report results. One exception is the kernel utilized for the Gabor features which is a polynomial kernel of $3^{rd}$ degree.

For the CNN, alter the topology of the network to reflect the number of classes of the problem in hand, which is 2. In one implementation, the number of classes was 1000. Since training a network from scratch is prohibitive given the limited amount of data, capitalize on a pre-trained network and fine tune it. This can significantly decrease the learning rates of the convolutional layers of the network and allow mostly the inner product layers to continue learning based on the dataset.

Different learning rates have with no significant impact on the performance. Initialize the weights of the network with weights learned on the 1 M image database of the ILSVRC challenge and perform additional 5K iterations, which can be shown to be sufficient for the problem in hand.

TABLE 12

Experimental Results

| Features \| Classifier | Myometrium | | Breast | | Prostate | |
| --- | --- | --- | --- | --- | --- | --- |
| | ACC | AUC | ACC | AUC | ACC | AUC |
| Intensities \| 5-NN | 46.33% | — | 49.69% | — | 69.54% | — |
| Intensities \| SVM | 50.51% | 0.53 | 57.91% | 0.60 | 73.71% | 0.82 |
| HOG \| 5-NN | 55.72% | — | 60.14% | — | 48.23% | — |
| HOG \| SVM | 62.89% | 0.68 | 51.86% | 0.53 | 69.51% | 0.76 |
| Gabor \| 5-NN | 46.60% | — | 52.09% | — | 48.66% | — |
| Gabor \| SVM | 84.37% | 0.89 | 65.60% | 0.71 | 83.54% | 0.92 |
| Fisher \| 5-NN | 59.31% | — | 63.49% | — | 75.57% | — |
| Fisher \| SVM | 74.91% | 0.83 | 79.66% | 0.88 | 84.37% | 0.93 |
| Sparse Codes \| 5-NN | 55.10% | — | 67.51% | — | 51.37% | — |
| Sparse Codes \| SVM | 76.54% | 0.85 | 72.31% | 0.78 | 69.66% | 0.77 |
| BOW \| 5-NN | 56.63% | — | 66.03% | — | 67.06% | — |
| BOW \| SVM | 74.85% | 0.81 | 76.46% | 0.84 | 83.09% | 0.92 |
| RCD-JBLD \| 5-NN | 92.53% | — | 67.06% | — | 79.09% | — |
| RCD-JBLD \| SVM | 95.24% | 0.98 | 74.26% | 0.81 | 87.29% | 0.92 |
| RCD-LE \| 5-NN | 91.81% | — | 67.09% | — | 79.66% | — |
| RCD-LE \| SVM | 91.93% | 0.97 | 87.66% | 0.94 | 89.77% | 0.96 |
| CNN(AlexNet) | 93.77% | 0.99 | 89.23% | 0.96 | 86.91% | 0.95 |
| NCH \| 5-NN | 95.03% | — | 84.60% | — | 82.00% | — |
| NCH \| SVM | 93.91% | 0.99 | 91.63% | 0.97 | 90.26% | 0.96 |
| CKD-JBLD \| 5-NN | 95.30% | — | 79.31% | — | 80.06% | — |
| CKD-JBLD \| SVM | 97.86% | 1 | 85.51% | 0.94 | 86.63% | 0.93 |
| CKD-LE \| 5-NN | 94.88% | — | 79.51% | — | 80.66% | — |
| CKD-LE \| SVM | 98.10% | 1 | 92.83% | 0.98 | 91.51% | 0.97 |

Consider the results in Table 12 for all the described feature representations in terms of ACC and AUC, as computed for the extracted ROC curves. FIGS. 13A, 13B, and 13C presents the resulting ROC curves for the classification experiments.

Based on these results, note that the tested descriptors that use color information perform better against those that are extracted based only on gray-scale intensities. This latter category of descriptors includes, gray-scale intensities, HOG, FVs. Gabor wavelets, sparse codes and BOW. Among those. FVs appear to achieve the highest accuracy as well as AUC, reaching accuracy of 74.91%, 79.66% and 84.37% for the myometrium, breast, and prostate dataset, respectively. This, though, comes with a computational overhead, derived from the large dimensionality of the descriptor. The NCH was the only feature representation that was built solely on color information. Nevertheless, this was shown to be sufficient to outperform all the aforementioned edge-based descriptors and was only exceeded by descriptors using both edge and color information. NCH achieved accuracy values reaching 93.91%, 91.63% and 90.26% for the myometrium, breast, and prostate dataset, respectively, accompanied by very high AUC. The achieved performances, combined with the low dimensionality and ease of computation makes this descriptor an attractive solution for cancer recognition tasks on H&E stained images.

In addition, descriptors balancing both color and gradient information can be considered. In particular. RCDs and CNN provide accuracies that are on par with the performance of the NCHs. RCDs exceeded the performance on myometrium by 1.33% but in the case of breast and prostate cancer they achieved a lower accuracy of 87.66% and 89.77% respectively. For the myometrium and prostate datasets, CNN representations achieved a lower accuracy (93.77% and 86.91% respectively) both compared to RCDs and NCHs. For the breast carcinoma, although CNNs exceeded the performance of RCDs (89.23%), they did not perform better than NCHs.

FIGS. 13A, 13B, and 13C illustrate ROC curves for myometrium, breast and prostate, respectively.

CKD, a descriptor introduced in this work, is seen to outperform all the considered descriptors, reaching ACC of 98.1%, 92.83% and 91.51% for the myometrium, breast and prostate dataset, respectively. The enhanced pixel intensity invariance infused by the color histogram Gram matrix, along with the gradient information and spatial correlation of pixel values integrated by the RCDs allowed this descriptor to reach an AUC value of almost 1 for the myometrium dataset.

An example of the present subject matter can be evaluated relative to general-purpose computer vision feature representations on three types of cancer. This document also discloses two descriptors. RCDs and CKDs in the context of cancerous tissue recognition. According to one example, CKDs can outperform all the representations including the deployed CNN scheme. The presented methodology can be applied to additional types of tissue, including the colon, pancreas, lung, and others.

Part 5: Active Convolutional Neural Networks for Cancerous Tissue Recognition.

Deep neural networks typically require large amounts of annotated data to be trained effectively. However, in several scientific disciplines, including medical image analysis, generating such large annotated datasets requires specialized domain knowledge, and hence is usually very expensive. Consider an application of active learning to data sample selection for training Convolutional Neural Networks (CNN). According to one example, the annotation effort is steered towards selecting the most informative samples for training the CNN. To quantify informativeness, consider three choices based on discrete entropy, best-vs-second-best, and k-nearest neighbor agreement. The proposed framework is effective for the application of automatic Cancerous Tissue Recognition (CTR)—a task that requires an expert pathologist for annotation. Results based on three different types of cancer tissue datasets demonstrate that under limited annotated samples, the proposed training scheme converges faster than classical randomized stochastic gradient descent, while achieving the same (or sometimes superior) classification accuracy in the recognition task.

Convolutional Neural Networks (CNN) have altered the domain of computer vision with performances of various applications trending towards human accuracy. One factor that has enabled this application of CNNs is the availability of large datasets. CNNs can involve millions of parameters to learn complex real-world tasks, which are prone to overfitting. One way to reduce overfitting is to increase data diversity, thus providing large annotated datasets for training.

However, there are several applications in which collecting such large amounts of annotated data is either challenging or very expensive. One such domain is medical image analysis, especially Cancerous Tissue Recognition (CTR). In this context, the tissue slides from suspected cancerous regions are examined under a microscope and are classified as benign or malignant—a task that not only requires the expertise of an experienced pathologist, but can be time consuming. While CNNs may be able to improve the accuracy of diagnosis once they are trained adequately, the training process itself is usually challenging due to the high expenditure of collecting large datasets. To circumvent this issue, one example of the present subject matter concerns active learning.

FIG. 14 illustrates an outline of an active training scheme. The annotation module $A_i$ corresponds to the interaction between the training scheme and a human annotator (e.g. surgical pathologist) during training stage i. The training module $T_i$ corresponds to the training process of the CNN in hand in the presence of the annotation harvested during previous stages. $\{1, 2, \ldots, i\}$. The module $P_i$ predicts the class labels of future samples in new batch during stage i based on parameter weights learned in the previous stages. The module $U_i$ quantifies the uncertainty on the predictions.

Active learning can select useful data samples in a variety of machine learning and vision applications, namely object recognition, text classification and human detection. Active strategies steer humans' annotation efforts towards data samples that have the highest uncertainty for the classifier being trained. Other uncertainty sampling schemes appear in the literature. Capitalizing on class probability vectors, the discrete entropy as well as the best-vs-second-best measure can be shown to be effective for active selection. In a clustering setup, an active constraint selection strategy that balances between uncertainty and spatial dispersion can be presented for clustering images.

One example of the present subject matter concerns active learning tailored for the selection of data samples to train a CNN consistent with enabling training with the reduced or minimal amount of annotated data.

Two considerations are of note when applying active learning to CNNs, namely (i) to allow learning without overfitting to the limited data given the large number of CNN parameters, and (ii) to score the data samples for selection based on their expected effectiveness in improving the overall CNN training objective. An example of the present subject matter includes a multi-stage training scheme to overcome these challenges. Each stage uses a small number of annotated data samples to train the CNN until it starts overfitting to the validation data. The CNN trained after every stage, is then used to predict the class labels on unseen data samples (active pool); the predictions are scored using an uncertainty measure.

FIG. 14 depicts an example of the framework. Various uncertainty measures can be used, and three such measures are considered here, namely (i) the discrete class entropy defined over the probabilistic output of the CNN, (ii) the difference of the best-vs-second-best class probabilities produced by the final layer of the CNN, and (iii) a quantification of the disagreement between a data sample and its k-nearest neighbors in the feature space learned by the CNN and refined in every stage.

To validate the effectiveness of one example of the disclosed subject matter, consider the scheme for classifying cancerous tissues against benign ones. Three different types of cancer image patches are considered, namely (i) Breast cancer, (ii) Prostate cancer, and (iii) Myometrium tissue samples. These patches are obtained by imaging Hematoxylin & Eosin (H&E)-stained tissues under a microscope. Marking each data sample as benign or cancerous is a time consuming process for a surgical pathologist and thus automation of the procedure is highly regarded, and can directly lead to faster diagnosis. One example of active learning can consistently lead to better training of the CNN, allowing it to converge much faster at a slightly higher accuracy than using the classical random sampling scheme in a batch-mode stochastic gradient descent training setup. This document also considers other computer vision datasets such as CIFAR-10 and Caltech-256 showing the generality of the scheme for other vision tasks.

This document describes a combination of active learning for CNN training. The disclosed subject matter can be summarized along three different axes, namely (i) that CNNs can benefit from active selection schemes, (ii) an evaluation of the usefulness of various uncertainty measures, and (iii) application of the scheme for CTR, for which this document discloses an active fine-tuning scheme.

Active selection methods can be used for text classification problem. At the core of active training schemes lies the efficient quantification of prediction uncertainty, which is a reflection of the confidence a model provides on the task. One researcher has theoretically demonstrated the positive effects of active learning via the derivation of an upper bound of queries in a Probably Approximately Correct (PAC) framework. A more concise collection of theoretical results supporting the ability of active learning schemes to operate in the presence of limited annotation can be shown.

Active selection schemes in the visual learning paradigm have been an area of focus over the past decade addressing challenging visual learning tasks. A binary classification setup can be used to derive an active scheme for the recognition of humans in an image. A minimization scheme over decision hyperplanes can be used for active selection. An active sampling strategy can be based on the output of a Gaussian process model. One achievement for active methods was the ability to be deployed in a multi-class setup. An entropy based active selection strategy can be used for object classification. Furthermore, an entropy reduction framework, in combination with a discriminative latent model can be used for visual category learning. The probabilistic output of Support Vector Machine models provides a measure for quantifying the uncertainty via a best-vs-second-best strategy. One example scheme outperformed random selection and entropy based active schemes. In addition, a scalable, cost-aware scheme can be used for active selection. A k-nearest neighbor method can be used for active selection in large multi-class problems involving target problems with a large number of classes. A crowd-sourcing based active scheme can be used to train object detectors. One example can consider the sub-linear sample selection time which is tailored to the size of the problems targeted.

The domain of supervised learning is shifting towards deep learning. In that direction, active selection procedures have been combined with multi-layer neural networks to enhance their performance. A fusion of active selection and deep learning can be used for sentiment classification. A semi-supervised scheme termed Active Deep Network (ADN) concerns enhancing the performance of Deep learning via active selection. An example of an enhanced Deep Belief Network via active selection uses a limited set of experiments.

Coupling of active selection strategies and cancer recognition can be derived from a Most Informative Positive (MIP) selection scheme. This approach can identify mutations in a tumor suppressor protein (p53), found in human cancers. Active selection for the classification of colon cancer, lung cancer, and prostate cancer samples can focus on gene expressions, in the cancer recognition setup.

One example of the present subject matter concerns the integration of active selection and CNNs in Machine Learning and CTR. This document presents an active CNN framework and provides a performance evaluation of different active selection strategies. Results on both popular object classification benchmarks and private CTR datasets support the merits of the proposed framework.

An example of the present subject matter utilizes a CNN as a classifier based on performance on a variety of related tasks. One example includes a multi-stage training scheme for the CNN as depicted in FIG. 14 involving multiple stages of training and augmentation of the training set by adding new annotated data; each newly added data sample is selected based on an informativeness criteria.

Formally, consider unfettered access to a large collection of data samples D; not all of them have associated annotations. Let $f_i: D \rightarrow \Delta_d$ define a CNN trained at the i-th stage that takes a data sample as input and produces a class probability vector (in the simplex $\Delta_d$) as output, where it is assumed there are d different class labels. Let $S_1 \subset D$ represent a (small) initial set of annotated samples. An example of the present subject matter starts by training the CNN using a training set $T=S_1$ for the cross-entropy loss. The training is continued until the model starts overfitting to the training data (as measured using a separate validation set). After training, select a subsequent subset $S_{i+1} \subset D \setminus \cup_{j=1}^i S_j$ from the training set and apply the current CNN model $f_i$ to generate classifier probabilities for the samples in $S_{i+1}$. These classifier probabilities are evaluated using an informativeness measure (as discussed elsewhere in this document). Suppose $A_{i+1} \subseteq S_{i+1}$ is a subset of this data batch that is deemed to be informative by the measure, then augment the training set $T=T \cup A_{i+1}$ and use it to train the CNN to generate a better model $f_{i+1}$. The method can be repeated until the training error plateaus. Note that if the cardinality of $A_{i+1}$ is less than a threshold, then sample more data batches to acquire sufficient training samples for the new training stage. FIG. 15 illustrates an example of active sampling.

FIG. 15 illustrates an example of Nearest Neighbor (NN) search for a sample of category "boat" of CIFAR-10. The top block depicts the 8-NNs of a sample image in the training set for the features learned during the $2^{nd}$ training stage. The bottom left block illustrates the 8-NNs of the selection sample image using the features learned during the $3^{rd}$ training stage using random sampling. The bottom right block presents the 8-NNs of the sample images for the features learned during the $3^{rd}$ training stage with active sampling.

The appropriate amount of annotations for each stage can be determined by the size of the stochastic gradient descent training batches, while the number of stage-wise training iterations can be guided by the descent in the validation data loss. However, in the absence of large amounts of initial annotated data that can ensure the proper convergence of training, fine-tuning a pre-trained CNN model could be used. In this case, consider using a model that is trained on a very large dataset for a task similar to the one in-hand (but perhaps with a different goal) to initialize the filter weights; one assumption is that it is cheaper to obtain data annotations for this surrogate task. For example, in a fine-tuning setup, initialize the filter weights of the CNN for the CTR task from a model trained on the Imagenet dataset which is annotated for the object recognition problem. Except for this pre-trained initial model, the rest of the active learning setup remains the same.

The quality of the data samples selected in each stage for training the CNN decides the effectiveness of the resulting model. To this end, one example uses the probability vector produced by the model f trained at the i-th stage and applied on the batch $S_{i+1}$ for the next stage. Consider two uncertainty measures defined on the probability simplex, namely (i) discrete entropy and (ii) the best-vs-second-best measures. Further, the outputs generated by the fully-connected layers (assuming Alexnet or VGG-net) of the CNN can be viewed as embedding the original high-dimensional data into a low-dimensional feature space—this embedding can be found to have a clustering effect on the data samples. Thus, measuring the similarity of these samples in the embedded space can be used for measuring their informativeness—a data feature that is near to several classes may be deemed uncertain about its membership and is a good candidate for active selection. According to one example of the present subject matter, consider using an additional uncertainty measure that captures the disagreement between k-NNs for every sample in the active pool.

In this section, consider different schemes for measuring the expected training impact of each data sample in the active pool. Several approaches can be used for measuring the informativeness of a data sample. For example, the farthest data sample to the current training set can be used as a criteria. As another example, a minimal number of samples to annotate can be used to maximize the expected accuracy. While the former might not help in propagating the ground truth annotations to new samples, the latter involves solving a difficult optimization problem which may be computationally expensive. In one example, consider a middle ground using data sample uncertainty as the criteria for active selection—this uncertainty is measured as the confusion in the trained classifier. There are several ways to quantify this confusion, such as the three different choices described below.

According to one example, one way for quantifying the uncertainty in the predictions of a model is the discrete entropy computed on the output class probability vector—each entry of which captures the probability of a data sample to take the associated class label. For a data sample $x \in S_{i+1}$ from the active pool for stage i+1, let $p(x)=f_i(x)$ $(p(x) \in \Delta_d)$ defines the probabilistic output of the CNN classifier trained in stage-i. Then, define the discrete entropy of the data sample x as:

$$H(x) = -\sum_{j=1}^{d} p^j(x) \log(p^j(x)), \quad (34)$$

where $p^j$ represents the j-th dimension of the probability vector. Use the output of the softmax output from the last layer of the CNN to compute p(x).

The discrete entropy measures the overall randomness of a data sample. According to one example, explicitly use the confusions in the classifier by quantifying the separability between the data classes as decided by the learned class-decision boundaries. One such heuristic is to use the difference between the best and the second-best output class probabilities—a smaller difference suggesting a higher confusion between the respective classes. This scheme can be used in an SVM setup by computing the distance of the data samples from the classifier boundaries. This approach has not been considered in the context of a CNN trained against cross-entropy loss. Reusing the notations from above, let $b_1 = \arg\max_{j \in (1, \ldots, d)} p^j(x)$ and $b_2 = \arg\max_{j \in (1, \ldots, d) \setminus b_1} p^j(x)$ be the indices of the best-vs-second-best classifier probabilities, then the best-vs-second-best uncertainty measure is defined as:

$$B(p(x)) = p^{b_1}(x) - p^{b_2}(x). \quad (35)$$

The above two uncertainty measures are based on the confidences of the CNN classifier. However, the CNN can be treated as a framework for dimensionality reduction. For example, the output of the intermediate layers of the network can be used as features for a variety of auxiliary tasks. According to one example, define the probability of a sample in the active pool to belong to a class as the annotation disagreement among its NNs; these NNs are computed in the embedded lower-dimensional space. To be precise, suppose $\tilde{x} = \tilde{f}_i(x)$ denotes the output of a given layer of the CNN in stage-i for an input $x \in S_{i+1}$. Further, let $y \in \{1, 2, \ldots, d\}$ be the class-label associated with the point x. Suppose, there are $n_c$ points in T (which is the training set with annotated samples) with class label c. Then, the NN agreement for class-c is defined as:

$$p_c(x) = \frac{\frac{1}{n_c} \sum_{\{x_j \in T | y_j = c\}} Dist(\tilde{x}, \tilde{x}_j)}{\sum_{c=1}^{C} \frac{1}{n_c} \sum_{\{x_j \in T | y_j = c\}} Dist(\tilde{x}, \tilde{x}_j)}, \quad (36)$$

where Dist(•, •) is some suitable similarity measure between the embedded data points $\tilde{x}$ and its neighbors $\tilde{x}_j$. In this paper, consider the class label agreement itself as the Dist(•, •) however, use the Euclidean distance of the embedded points for computing the nearest neighbors. Specifically, for every unlabelled sample, use the ground-truth labels for its k-NNs in T. Following that, construct a normalized histogram on the label occurrences as described. This vector is an approximation of the probability vector capturing the likelihood of belonging to a class. This precedes computation of the discrete entropy of the class probability vector as described earlier towards quantifying the uncertainty associated with every prediction.

In this section, consider five different datasets to evaluate an example of an active learning framework for training CNNs. First, align the experiments to understand the behavior of the scheme for the following scenarios, namely (i) performance of the scheme on a small scale dataset (such as CIFAR-10 dataset), which helps prove the correctness of the scheme, (ii) performance when there are several data classes (such as the Caltech-256 dataset), and (iii) performance on the task in-hand, i.e., cancerous tissue recognition. For (iii), use images from three different types of cancers. Below are details of the learning setup, which will precede details of the respective datasets and performance of the scheme on each.

Setup

The Berkeley Vision and Learning Center Caffe framework can be utilized, which allows for the training and testing of CNNs on GPUs. In particular, the MATLAB wrapper distributed with Caffe can be used to access the functionality of the toolbox. On the hardware side, use a single graphics card (NVIDIA TITAN X. Pascal Architecture) on a machine with a quad-core Intel i7 processor and 32 Gb of memory. MATLAB 2016a can be used for experiments. For this section, assume some basic familiarity with the core CNN terminology. The different CNN layer types can be selected. For the set of experiments, consider two object classification benchmarks as well as three private cancerous tissue recognition datasets. In the following, active learning improves CNN training performance.

CIFAR-10 Dataset

This is a subset of the 80-million tiny images dataset. FIG. 16 illustrates 20 random samples from the CIFAR-10 dataset. This dataset is a benchmark for object classification and holds a collection of 60.000 images belonging to 10 different classes. It is split into a training and a test set of 50,000 and 10,000 images respectively. The small size of the images (32×32 pixels) and the large variability between objects of the same class render it a challenging dataset for object classification.

For the experiments on CIFAR-10, start the training by randomly initializing the CNN filter weights. The network topology used for this experiment can be selected and one example is distributed with the Caffe package. It includes convolutional, rectified linear unit, contrast normalization, and pooling layers, while the loss is defined by softmax cross-entropy. The base learning rate is set to 0.001 (fixed) with a momentum of 0.9 and weight decay of 0.004. Sixty thousand iterations was found to be sufficient for convergence of the first training stage and 30K for the subsequent stages. For the initial training stage, 12,500 samples were annotated and following that, an allowance of 2,500 sample annotations was used for every subsequent training stage. The active pool prior to training is 50.000 samples and consists of the whole training set of CIFAR-10. For the uncertainty measure based on NN-agreement, it will be noted that working with 31-NNs is the most effective.

FIG. 17 illustrates results using the active CNN framework on the CIFAR-10 dataset. The x-axis depicts the number of annotated samples used for training, while the y-axis depicts the accuracy achieved on the test set. Ten training stages are used. As shown, all the active schemes consistently performed better than random selection. Among the different active selection measures, the k-NN agreement scheme performed slightly better. In particular, for the $6^{th}$ training stage the k-NN agreement measure achieved higher accuracy by 1.1% compared to the other two uncertainty measures and 2.6% more than random selection. Another observation is that via active selection, the performance achieved using 25K annotations (75.15%) is approximately equal to the performance of random sampling (75.23%) when 35K annotations are provided. This observation favors the example of the present subject matter, since in many realistic scenarios additional annotations might not be provided or might be very expensive.

Caltech-256 Dataset

FIG. 18 illustrates samples of the Caltech-256 dataset. Caltech-256 is a challenging object classification dataset. It is a collection of 30,607 images of different sizes belonging to 257 different classes. The intra-class variability of the dataset is large and objects do not appear (in many cases) in the center of the images. Caltech-256 was found to be a good candidate to evaluate an example of the present subject matter under a constrained computational setup. A random split (80% for training and 20% for testing) generated a 24,485 samples training set and a 6,122 test set. The images were resized to 256×256 pixels and cropped a 227×227 frame from those to enforce uniformity over the image sizes.

The Caffenet topology, distributed with the Caffe framework, can be used for fine-tuning on the Caltech-256 datasets, while weight initializations can be taken from training the network on the 1 M image database of the ILSVRC challenge. The Caffenet topology is a deeper topology than the one used for CIFAR-10 and requires a larger amount of data to properly train the network from the beginning. The weights of all intermediate layers of the network can be reduced to 15% of the values that are provided with the Caffe distribution for Caffenet. In addition, the layer associated with the number of classes can be altered to depict the correct number of classes for Caltech-256, which is 257 and allows that layer to learn at its original pace (no decrease). Set the base learning rate to 0.01, select a step strategy that decreases the rate every 10K iterations and set the weight decay to 0.005. For the first training stage, perform 60K iterations while 40K iterations can be performed for all the subsequent stages. For the uncertainty measure based on NN-agreement, one example uses 51-NNs as the most effective for this dataset.

FIG. 19 provides the results obtained from the active fine-tuning on Caltech-256 for 8 training stages. The overall pattern of the performance curves indicates that active selection schemes aid the training of the CNN, nevertheless, the magnitude of the improvement when compared to random selection is not as significant as for the other considered datasets. Active schemes reached a 1.1% increase in performance on the test when compared to random selection. A potential explanation for this limitation in performance can be the following. CNNs iteratively refine the learned features based on feedback that they receive for regions of the feature space associated with high ambiguity in every training stage. Given that the classification problem consists of 257 classes, the potential candidate regions of ambiguity are $$\binom{257}{2}$$

corresponding to uncertainties generated at the boundaries of all pairs of classes. By resolving ambiguities at one boundary, samples in a subsequent training stage could be transferred to sections of the feature space where they overlap with other classes. This provides a plausible explanation for the limited merits of active selection on Caltech-256. Providing a much larger annotation budget per training stage can potentially resolve this problem and is under investigation. For this to happen, consider the performance of the current framework on larger datasets, such as the Pascal VOC datasets, which can accommodate larger annotation budgets per stage.

Cancer Datasets

FIG. 20 illustrates breast tissue H&E stained samples. Columns 1-3 correspond to patches depicting benign cases while columns 4-6 correspond to patches depicting malignant cases.

In one example, consider the problem of CTR based on Hematoxylin & Eosin (H&E) stained tissue samples. H&E staining is a commonly used technique in pathology. Hematoxylin stains the nuclei in blue or dark purple color, while Eosin imparts a pink or lighter purple color to the cytoplasm. The tissue samples collected are first (H&E)-stained, followed by high resolution (10K×9K pixels) scans of tissue sections taken at ×50 magnification under a digital slide scanner. Medical experts (surgical pathologists) can provide annotations corresponding to the malignant and benign image regions. The annotated regions can then be divided into smaller disjoint patches of 150×150 pixels. Different patch sizes can be tested with the size of 150×150 providing good classification accuracy. Later, binary class labels can be assigned to each of the image patches. That is, those patches for which more than 80% of the pixels correspond to carcinomas are treated as the positive class, while patches in the negative class are devoid of any cancerous regions. Due to the lack of widely accepted CTR benchmarks, results on private datasets can be provided. A more detailed description on the utilized cancer datasets, as well as alternative feature representations is available.

FIG. 21 illustrates myometrium tissue H&E stained samples. Columns 1-3 correspond to patches depicting benign cases while columns 4-6 correspond to patches depicting malignant cases.

Samples of benign and malignant prostate regions are illustrated in FIG. 22. FIG. 22 illustrates prostate tissue H&E stained samples. Columns 1-3 correspond to patches depicting benign cases while columns 4-6 correspond to patches depicting malignant cases.

In this work, three types of cancer are considered. First, for the case of carcinomas of the breast, 21 annotated images of carcinomas and 19 images of benign tissue, taken from 21 patients, are combined towards deriving a 17,497 sample dataset, 3.913 samples depicted benign tissue, while 13,584 patches corresponded to cancerous tissue. FIG. 20 presents 12 samples of the breast cancer dataset with the first 3 columns illustrating benign cases, while columns 4-6 depict image patches associated with carcinomas. Second, 39 myometrial leiomyomas were combined with 41 images of leiomyosarcomas to construct the second dataset for the myometrium from 39 patients. In one example, consider randomly selecting 1539 cancerous image patches and combining them with 1782 benign patches to derive a dataset of 3321 samples. Similar to the case of breast cancer, FIG. 21 depicts 12 samples of the dataset corresponding to the myometrium with columns 1-3 depicting benign cases and columns 4-6 corresponding to malignant tissue. Finally, for prostate cancer, 31 images of carcinomas and 8 images from benign regions are annotated, taken from 10 patients. A 3500 image patches dataset was created with 1750 patches depicting cancerous regions, with the other 1750 corresponding to benign regions.

For the processing of the three cancer datasets, consider a similar approach as the one adopted for Caltech-256. Two differences with training on Caltech-256 are that instead of 257 classes, this situation presents a binary classification problem. Also, due to the lower complexity of the problem, the network needed less iterations for convergence. In particular, set the base learning rate to 0.0001 and select a step strategy that decreases the rate every 2.5 K iterations and also set the weight decay to 0.005. Ten thousand iterations can be performed for the first training stage, and 5 K iterations can be performed for subsequent stages. For the uncertainty measure based on NN-agreement, 41-NNs is effective.

FIG. 23 presents the results obtained on the breast cancer dataset for 16 training stages. All three active schemes can be found to be consistently more accurate when compared to the random selection scheme. For the first training stage, 3.5K annotated samples were selected and remained the same for all the sampling strategies. For all subsequent training stages, 500 additional annotations can be provided. Active schemes reached a 2.2% increase in performance on the test when compared to random selection after the 6$^{th}$ training stage. Furthermore, active schemes for the case that 5.5K annotated samples were provided, achieved a performance as high as random selection when 11K samples were provided for training; this is 50% decrease in the number of queries, which strongly supports the merits of the present subject matter. For all three uncertainty sampling schemes the achieved performance was comparable.

For the myometrial leiomyomas dataset, FIG. 24 presents the results for 12 training stages. For the first training stage, 540 annotated samples can be provided, while the training set can be augmented by 150 samples for the subsequent training stages. The largest performance gains for active schemes can be achieved for the case where 1140 annotated samples are provided and reached 2.1%. Furthermore, interestingly, the similarity to the case of breast cancer, demonstrates higher performance (94%) with 50% of the annotated samples that the random selection required to reach an equivalent performance (93.2%).

For the prostate cancer dataset. FIG. 25 illustrates the extracted performance curves for 14 training stages. For the first training stage, 560 annotated samples can be used, while 150 annotations can be provided for every subsequent training stage. For the case where 1.01K annotations are provided, random selection can perform significantly less than active schemes (entropy) with a 2.9% difference in the obtained performance. An instance highlights the annotation gains of the proposed framework. Consider that random selection requires 40% more annotated samples to reach accuracy of 89.3% when compared to the entropy based active selection scheme. The best accuracy is attained by the best-vs-second-best scheme for the case where 2.21K samples are provided for training, reaching 89.6%.

One example of the present subject matter includes a framework for training CNNs using active data sampling for the problem of cancerous tissue recognition. An example uses active learning and a multi-stage CNN scheme that trains a CNN incrementally in stages. Three different uncertainty quantification schemes for data sampling are considered here. The framework can be evaluated on a diverse collection of five different datasets, including two general computer vision datasets and three cancer tissue datasets. Results indicate that active learning is beneficial and leads to faster training of the CNN (when the annotated training budget is limited), while achieving similar (or sometimes slightly superior) accuracy than randomized sampling schemes. For some scenarios, observed query reductions reached 50%, while the absolute performance on the CTR datasets reached 93.4%, 94.1% and 89.9% for breast cancer, myometrial leiomyomas and prostate cancer respectively. Three different active selection schemes behave similarly in most cases. The correct number of nearest neighbors can improve outcomes with NN-agreement scheme.

Part 6: Additional

An example of the present subject matter can include a computer system configured to process images and implement a machine-learning function to recognize cancerous tissue. The system can facilitate recognition of cancerous tissue or tissue having other disorders. One example provides highly accurate tissue classification which can be used for diagnosing difficult cancer conditions.

Earlier attempts have treated tissue in a two dimensional space and have relied on human visual perception to discern a physiological condition. In some instances, tissue staining and color representations presented to pathologists for interpretation are sometimes difficult to discern, leading to uncertainty and possibility for misdiagnosis.

An example of the present subject matter provide a three dimensional (3D) reconstruction of an organ or tissue. The output representation can include a 3D image using different colors to show tumor and to show normal tissue. The series of illustrations in FIGS. 26A-26G depict sample output representations in 3D, in a point cloud format, showing a kidney having a region of cancerous tissue. In the figures, the red region represents cancerous tissue identified using an example of the present subject matter. The size of the illustrated tumor relative to the kidney is 0.02.

A point cloud can include a tissue representation or a surface representation rendered in a three-dimensional coordinate system. The resulting images can be presented to a user on an output module such as a display, a screen, a visible model, a user interface (such as an input device or graphical user input device) or the images can by communicated to others by means of a communication network.

FIG. 27 illustrates system 1000 configured to implement an example of the present subject matter. System 1000 includes imager 1010, memory 1020, processor 1030, display 1040, user interface 1050, and network interface 1060. In various examples, system 1000 can be configured for collecting images, for receiving user input (such as for training), and for classifying the tissue represented in the images.

Imager 1010 can include a camera, a scanner, or other device for receiving information as to tissue samples. Memory 1020 can provide storage for data and instructions. For example, images corresponding to the tissue can be stored in memory 1020. In addition, computer executable instructions for implementing the various algorithms described elsewhere in this document can be stored in memory 1020. The algorithms can be tailored to implement training or tailored to classify tissue. Processor 1030 can include a digital or analog processor and execute instructions and access content stored in memory 1020. Processor 1030 can be a special purpose processor tailored for performing the image processing and deep learning described elsewhere in this document. Display 1040 can include a visual display or monitor to allow a user to visualize tissue and data, and interact with system 1000. The sample kidney images presented elsewhere in this document can be presented to a user via display 1040. User interface 1050 is configured to receive user selections and provide prompts to a user for interacting with system 1000. User interface 1050 can allow a user to select specific portions of an image, annotate an image, change magnification and otherwise manipulate an image. Network interface 1060 can include a wired or wireless communication channel by which system 1000 can communicate or exchange data with other network elements.

FIG. 28 illustrates method 1100 according to one example of the present subject matter. Method 1100 can be configured to implement a covariance-kernel descriptor method as described elsewhere in this document.

Method 1100 includes, at 1110, receiving an image set. The image set can be received from a camera or scanner, and in one example, is received by way of a network interface.

In various examples, an image set includes an H&E stained set of images for a specific tissue specimen.

At 1130, method 1100 includes implementing a region covariance descriptor scheme. The RCD scheme can include using the image set in calculating one or both of $D_{LERM}$ and $D_{BJLD}$ as described elsewhere in this document. At 1120, method 1100 includes implementing normalized color histogram as described elsewhere in this document. Following 1100 and 1120, at 1140, the data is fused to generate a covariance kernel descriptor. Fusion is described elsewhere in this document. At 1150, the fused image is output in the form of classification.

Other methods can be implemented using system 1000 as described in this document. For example, an active learning scheme can be implemented. The learning scheme can include measures tailored to reduce the effects of bias on the classifier.

VARIOUS NOTES

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third." etc. are used merely as labels, and are not intended to impose numerical requirements on their objects.

Geometric terms, such as "parallel", "perpendicular". "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system comprising:
    an imager configured to provide a plurality of histopathological images for a region of a tissue sample;
    a processor coupled to the imager and configured to receive the plurality of histopathological images, the processor coupled to a memory, the memory having instructions for determining classification of the region of tissue associated with the plurality of histopathological images, wherein determining classification includes fusing discriminator outputs from a region covariance descriptor and from a normalized color histogram discriminator; and
    an output module coupled to the processor, the output, module configured to provide a three dimensional representation of the region of the tissue.

2. The system of claim 1 wherein the processor is configured to fuse discriminator output from the region covariance descriptor with a positive definite kernel matrix generated from color histograms.

3. The system of claim 1 wherein the processor is configured to receive an output from the normalized color histogram discriminator corresponds to a normalized histogram.

4. The system of claim 1 wherein the processor is configured to receive an output from the region covariance descriptor in which the region covariance descriptor provides covariance matrix of five dimensions.

5. The system of claim 1 wherein the processor is configured to determine a classification based on a sparse code and a dictionary matrix.

6. The system of claim 1 wherein the processor is configured to determine a classification based on at least one of a bank of Gabor filters, a histogram of oriented gradients, a plurality of Fisher vectors, and a convoluted neural network model.

7. The system of claim 1 wherein the processor is configured to determine a classification based on a covariance-kernel descriptor.

8. The system of claim 7 wherein the processor is configured to determine a classification based on a bag of visual words representation and based on scale invariant feature transform descriptors.

9. The system of claim 1 wherein the imager includes a graphical user interface.

10. The system of claim 9 wherein the graphical user interface is configured to allow user selection of magnification of an image.

11. The system of claim 9 wherein the graphical user interface is configured to allow user selection of the region.

* * * * *